United States Patent [19]
Fox

[11] Patent Number: 5,742,238
[45] Date of Patent: Apr. 21, 1998

[54] SYSTEM FOR COMMUNICATION BETWEEN A CENTRAL CONTROLLER AND ITEMS IN A FACTORY USING INFRARED LIGHT

[75] Inventor: Christopher Wayne Fox, Englewood, Colo.

[73] Assignee: Emtrak, Inc., Chanhassen, Minn.

[21] Appl. No.: 522,692

[22] Filed: Sep. 1, 1995

[51] Int. Cl.⁶ .............................. H04B 1/16; H04Q 1/00; G08B 13/14
[52] U.S. Cl. .......................... 340/825.49; 340/825.35; 340/825.54; 340/825.36; 340/505; 340/568; 340/572; 455/343
[58] Field of Search ................ 340/825.35, 825.49, 340/825.54, 505, 568, 572, 825.36; 455/343; 235/382.5

[56] References Cited

U.S. PATENT DOCUMENTS

| | | | |
|---|---|---|---|
| 3,745,569 | 7/1973 | Works et al. | 343/6.5 SS |
| 3,812,328 | 5/1974 | Tramposch | 235/61.12 N |
| 3,852,755 | 12/1974 | Works et al. | 343/701 |
| 4,068,232 | 1/1978 | Meyers et al. | 343/6.8 R |
| 4,570,058 | 2/1986 | Havassy | 235/479 |
| 4,600,630 | 7/1986 | Quinn et al. | 428/203 |
| 4,611,380 | 9/1986 | Abe et al. | 29/430 |
| 4,636,950 | 1/1987 | Caswell et al. | 364/403 |
| 4,642,017 | 2/1987 | Fenn | 414/348 |
| 4,656,463 | 4/1987 | Anders et al. | 340/572 |
| 4,670,295 | 6/1987 | Quinn et al. | 422/54.1 |
| 4,724,427 | 2/1988 | Carroll | 340/572 |
| 4,734,698 | 3/1988 | Nysen et al. | 342/44 |
| 4,775,786 | 10/1988 | Yamano et al. | 235/490 |
| 4,786,907 | 11/1988 | Koelle | 342/51 |
| 4,814,742 | 3/1989 | Morita et al. | 340/825.54 |
| 4,827,110 | 5/1989 | Rossi | 235/376 |
| 4,827,395 | 5/1989 | Anders et al. | 364/138 |
| 4,833,306 | 5/1989 | Milbrett | 235/375 |
| 4,837,568 | 6/1989 | Snaper | 340/825.54 |
| 4,843,640 | 6/1989 | Juengel | 455/604 |
| 4,857,893 | 8/1989 | Carroll | 340/572 |
| 4,862,160 | 8/1989 | Ekchian et al. | 340/825.54 |
| 4,888,473 | 12/1989 | Rossi | 235/376 |
| 4,941,201 | 7/1990 | Davis | 455/41 |
| 4,962,466 | 10/1990 | Ruesz et al. | 364/518 |
| 4,990,892 | 2/1991 | Guest et al. | 340/573 |
| 5,005,125 | 4/1991 | Farrar et al. | 364/403 |
| 5,097,421 | 3/1992 | Maney et al. | 364/478 |
| 5,119,104 | 6/1992 | Heller | 342/450 |
| 5,146,207 | 9/1992 | Henry et al. | 340/573 |
| 5,153,842 | 10/1992 | Dlugos, Sr. et al. | 364/478 |
| 5,204,986 | 4/1993 | Ito et al. | 455/343 |
| 5,262,885 | 11/1993 | Steers et al. | 359/152 |
| 5,266,925 | 11/1993 | Vercellotti et al. | 340/572 |
| 5,276,496 | 1/1994 | Heller et al. | 356/141.5 |
| 5,327,115 | 7/1994 | Swierczek | 340/309.15 |
| 5,339,074 | 8/1994 | Shindley et al. | 340/825.31 |
| 5,387,993 | 2/1995 | Heller et al. | 359/155 |
| 5,572,195 | 11/1996 | Heller et al. | 340/825.35 |

*Primary Examiner*—Michael Horabik
*Assistant Examiner*—Yonel Beaulieu
*Attorney, Agent, or Firm*—Haugen and Nikolai, P.A.

[57] ABSTRACT

A system using microterminals attached to work pieces, containers and workers for tracking the location of work in a factory and for communication with workers to provide instructions for further processing. A central control system, to which infrared transceivers strategically located throughout the factory are wired, communicates with the microterminals via infrared transmissions between the microterminals and transceivers. The microterminals have four modes of operation to extend battery life.

9 Claims, 24 Drawing Sheets

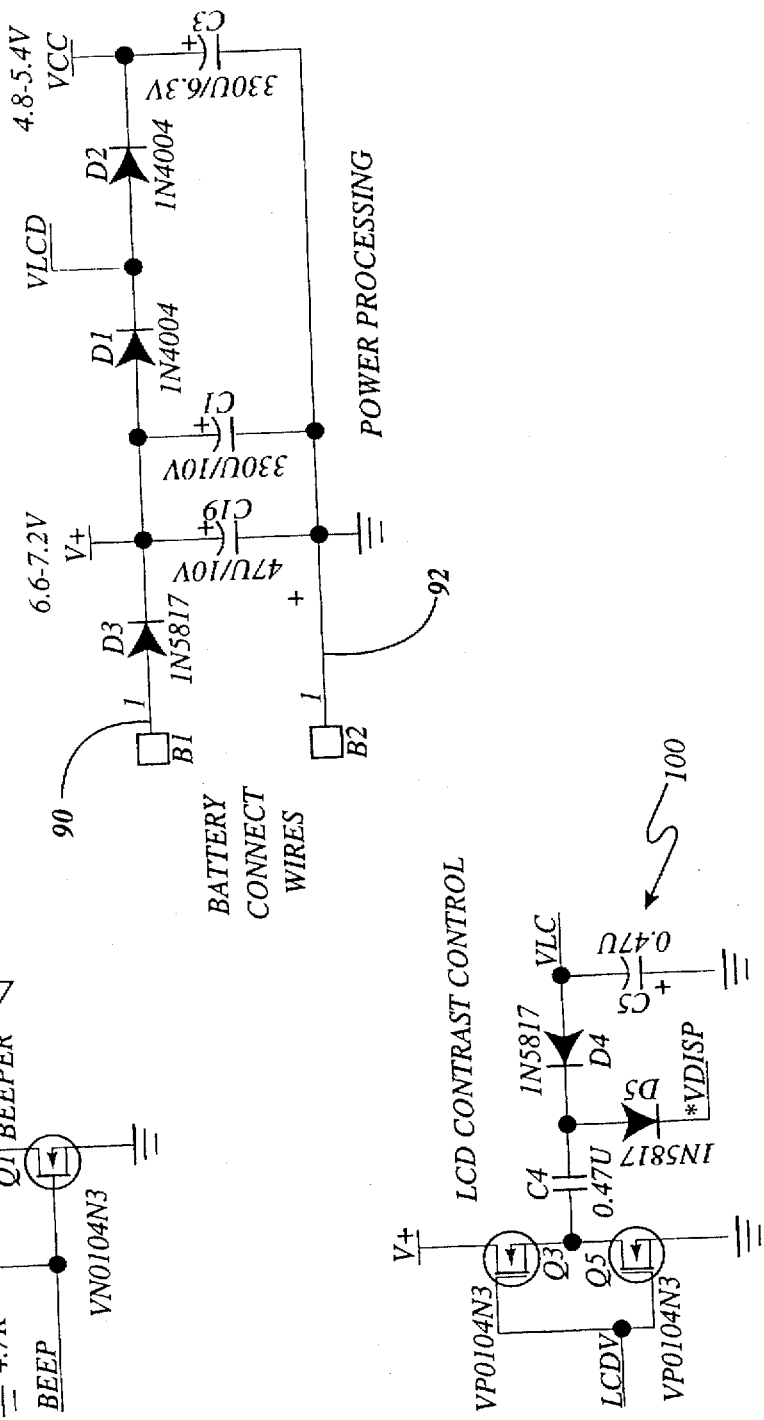
Fig. 11
Fig. 10
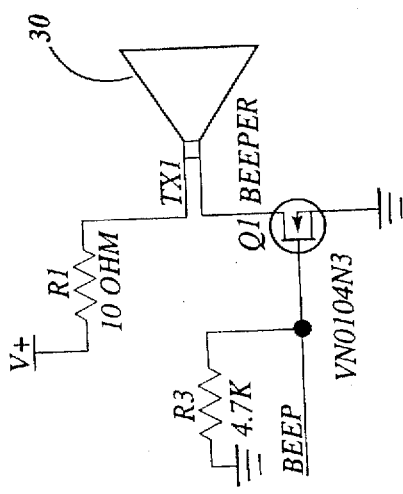
Fig. 12

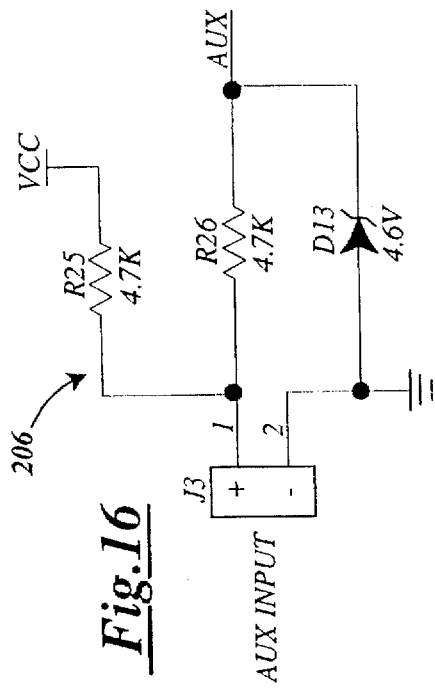
*Fig.16*
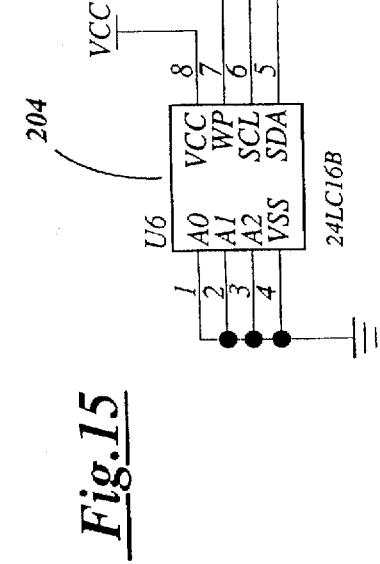
*Fig.17*
*Fig.15*

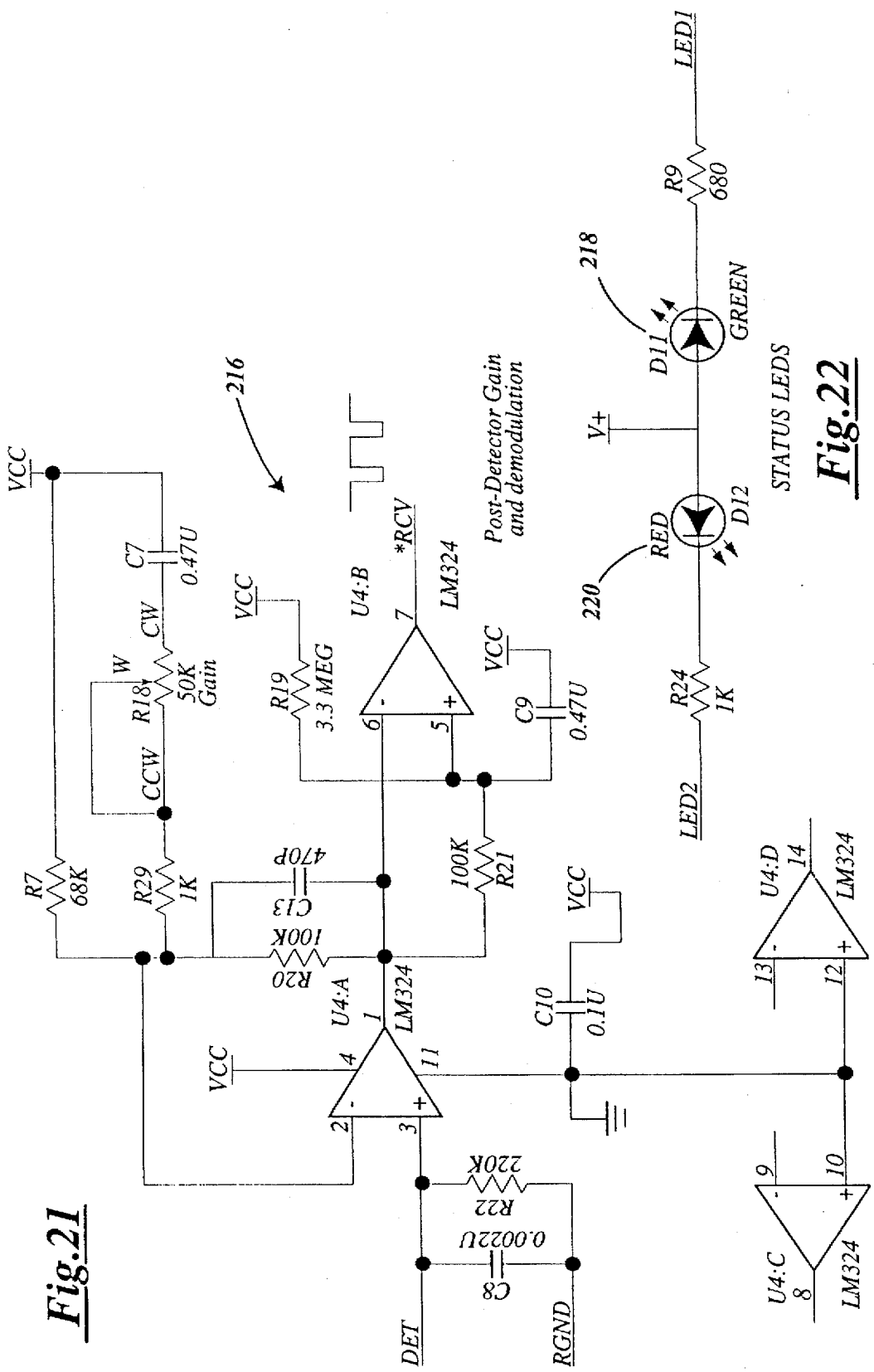

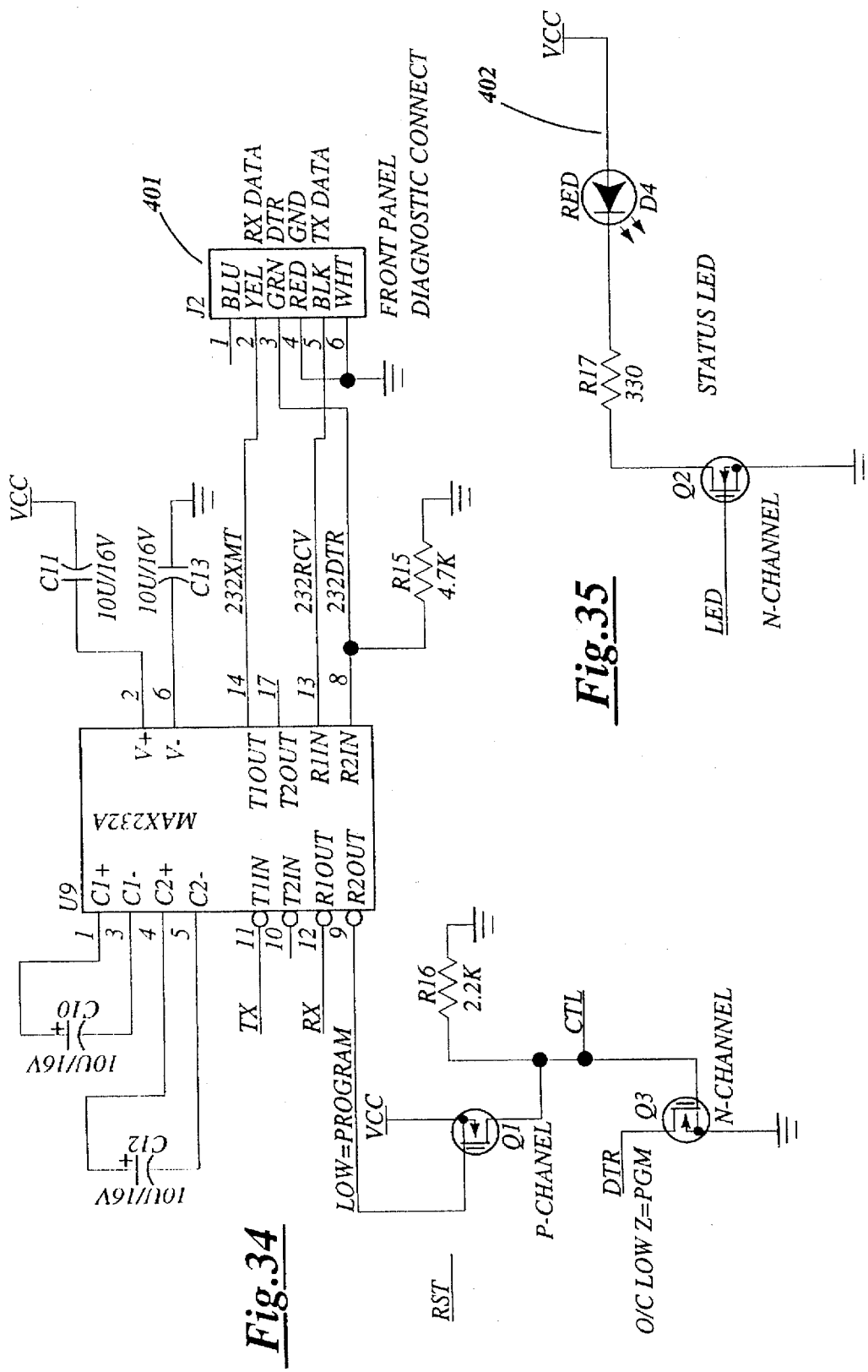

SYSTEM FOR COMMUNICATION BETWEEN A CENTRAL CONTROLLER AND ITEMS IN A FACTORY USING INFRARED LIGHT

BACKGROUND OF THE INVENTION

Field of the Invention

The present invention relates to a system which provides two necessary and distinct functions in managing a manufacturing operation. First, the present invention provides a system which is capable of tracking the location of work pieces in the factory. Second, the present invention provides a system for providing wireless communications between a central control system and microterminals located on the work pieces or containers for the work pieces. The microterminals can be used to alert workers to prevent misprocessing of the work piece or provide instructions to workers to correct problems without delay.

A number of patents have recently been issued related to systems for identifying and tracking items or personnel in the workplace. For example, U.S. Pat. No. 5,097,421, to Maney, et al., which issued on Mar. 17, 1992, describes a system used in conjunction with semiconductor manufacturing. This system includes a plurality of transportable containers for holding semiconductor wafers during manufacture. Attached to each of these transportable containers is an intelligent data card which can be read and updated by equipment mounted on each processing station in the factory. More specifically, each processing station includes a data processor for communicating with the electronic data cards mounted on the transportable containers. The data processor allows information to be downloaded from the card on the container by the processing tool. This data processor can also be used to update information on the data card.

Several problems exist with systems such as those shown in the Maney patent. First, there is no central system for tracking the location of the transportable containers. Second, operator intervention is required in order for communication to take place. Thus, one of the transportable containers could sit on a shelf for days, months, or even years without further processing. This is because the system shown in Maney requires that the operator present the work for inspection by a fixed scanning device. Such systems offer only samples, or snapshots, of work locations and cannot track work anywhere except when it is located at the processing tool.

Many of the problems inherent in systems such as that shown in the Maney patent are solved by the system disclosed in U.S. Pat. No. 5,387,993, issued on Feb. 7, 1995 to Heller, et al. The Heller patent discloses a system having a central controller connected to a plurality of optical transceivers which communicate with transceiver tags attached to each of the containers used in the factory. The system used to track the location of the containers disclosed in the Heller patent is passive in the sense that it does not require a factory worker to bring the tag in to close proximity with a checking station. However, the Heller system is still lacking in several material respects. First, Heller merely discloses a tracking scheme and there is no provision of means for conveying instructions to workers in the factory. Specifically, there is no display on the tags. Likewise, there is no input means on the tag by which workers in the factory can communicate back to the central controller. Finally, while the Heller patent does disclose a sleep mode to minimize battery consumption, this mode is quite different from the scheme utilized in the present invention. Thus, the present invention substantially increases the life of the batteries used to power the tags.

Accordingly, a need exists for a system which provides both the function of tracking the location of items within a factory and also provides microterminal operations so that workers in the factory are able to communicate with a central controller to prevent misprocessing and to receive instructions necessary to correct problems without delay.

SUMMARY OF THE INVENTION

The present invention relates to a system for providing wireless communication between a central control system and microterminals located on containers for transporting items to be manufactured within a factory. The system provides both the function of tracking the location of items equipped with a microterminal and also provides the function of providing direct communication between the central controller and workers in the factory via the microterminal.

The system includes communication microterminals attached to each of the items to be tracked. The system also includes a plurality of infrared transceivers (IRTs) mounted strategically throughout the factory. The IRTs are hardwired to a system controller. The IRTs are used to communicate information between the system controller and the microterminals in the factory. The system is also designed so that the microterminals and IRTs can be used to track the location of the microterminal within the factory.

In addition to the basic elements of the system outlined above, the system may also include items such as tags and cards printed with alphanumeric characters or a bar code in combination with either OCR or bar code readers. The system may also be configured to serve as a node on a local area network to provide communication between the central controller and the file server or other computers or terminals attached to the local area network.

In terms of tracking, the system of the present invention provides several important advantages. First, no operator intervention is required to track the location of the microterminals. Hence, human error is eliminated. Similarly, because the tracking is passive in nature and requires no operator intervention, the need for training and enforcement of additional protocols within the factory is eliminated. Finally, the precision of the tracking can be customized based on upon placement of the IRTs throughout the factory.

While other patents have described the use of ultrasonic or RF transmissions in tracking or communication schemes, the use of infrared light to perform such communications provides a variety of important advantages. First, infrared light is highly directional. Second, infrared light is not transmitted through walls, panels, doors and the like located within the factory. Third, average power required for such communication is low because messages are short and the rate at which data can be modulated on the infrared light is very high. Fourth, the infrared spectrum is relatively quiet and free of interference. Even when interference does exist, it can be easily shielded from view.

Various patents that discuss ultrasonic or RF transmission criticize the use of infrared light because the path between the two communication elements can be blocked at times causing disruption of tracking or communications. The inventors of the present invention have found that this problem is easily overcome. Proper placement of the IRTs permits the microterminals to be tracked about 90% of the time. Proper positioning of the IRTs in the factory also permits effective communication between the microterminal and the IRTs.

Other advantages are achieved in the present invention, in terms of battery life, given the unique modes of operation of the microterminals. The microterminals have four modes of operation: standby mode, an operate mode, a power saving mode, and an extended sleep mode. Effective use of these four modes of operation significantly increase the life expectancy of the lithium batteries used to power the microterminals.

A greater understanding of the present invention and its many advantages can be derived from a review of the following detailed description of the invention, the drawings contained herein, and the claims set forth below.

FIG. 10 is a schematic diagram of the circuit used by the controller of the microterminal to generate audible signals.

FIG. 11 is a schematic diagram of the power processing circuit of the microterminal shown in FIG. 2.

FIG. 12 is a schematic diagram of the circuit used to control the contrast of the LCD display of the microterminal shown in FIG. 2.

FIG. 15 is a schematic diagram of a memory module used in the infrared transceivers of the present invention.

FIG. 16 is a schematic diagram of the auxiliary port which can be used to communicate data to the controller of the infrared transceiver.

FIG. 17 is a schematic diagram of the infrared emitter driver of the infrared transceiver.

FIG. 21 is a schematic diagram of the infrared detection gain and demodulator circuit of the infrared transceiver.

FIG. 22 is a diagram of the visual status indicator of the infrared transceiver.

FIG. 34 is a schematic diagram of the connector used to run diagnostics on the Ethernet interface.

FIG. 35 is a schematic diagram of a driver for the status LED of the Ethernet interface.

DETAILED DESCRIPTION OF THE PREFERRED EMBODIMENT

Figure 1:
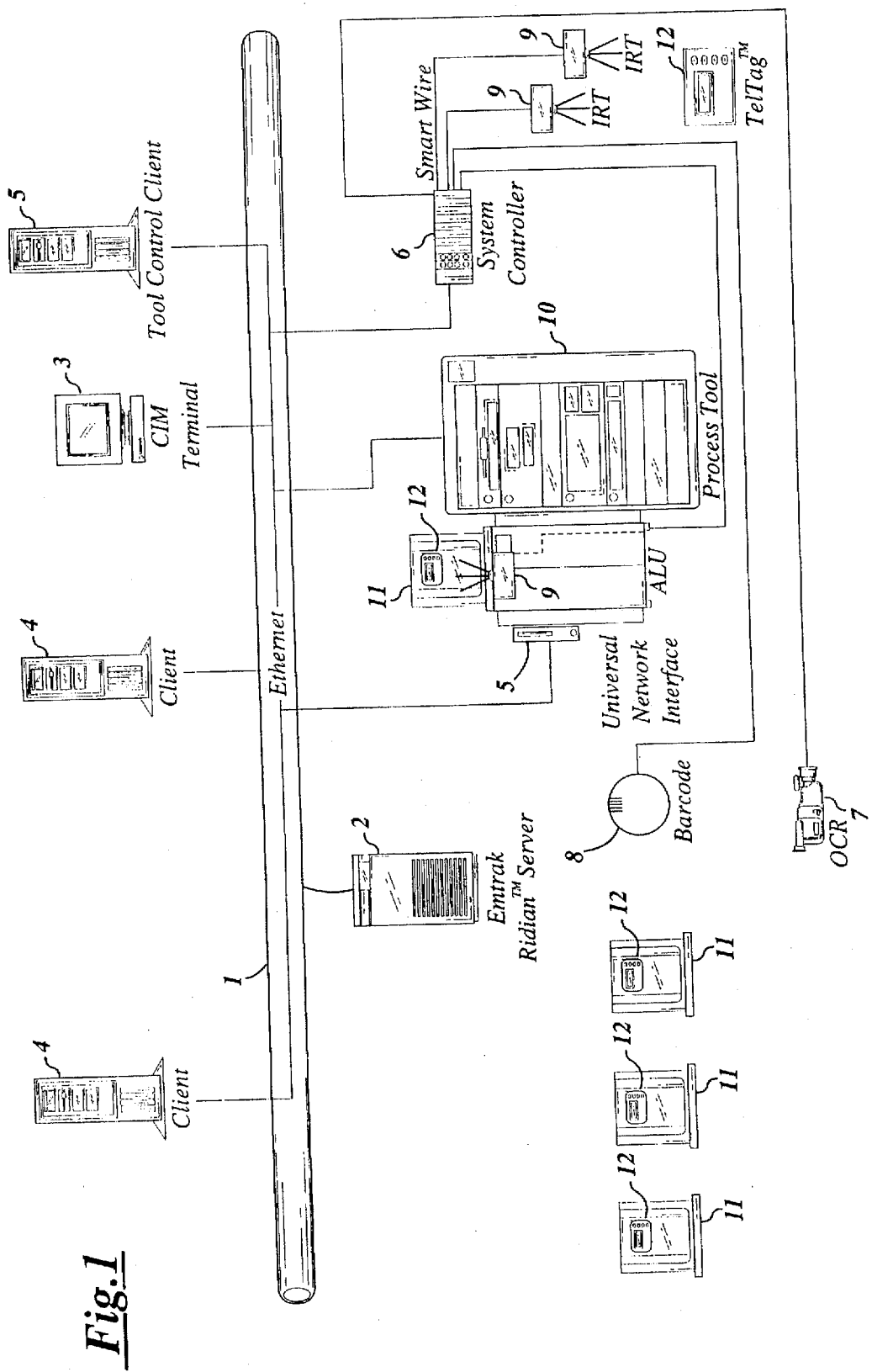
FIG. 1 is a block diagram showing the arrangement of various interconnected components of the factory communication and tracking system of the present invention.

FIG. 1 is intended to show the arrangement of various hardware components of a typical installation of the present invention. As shown in the drawing, a local area network 1 is established using Ethernet Ten-Base-T wiring. Attached to the local area network is a file server 2, a CIM (computer integrated manufacturing) terminal 3, a number of client application computers 4, one or more computers 5 configured to control processing equipment within the factory, and a system controller 6. Wired to the system controller 6 can be one or more optical character readers 7, one or more bar code readers 8, and a plurality of infrared transceivers (IRTs) 9. In a typical arrangement, the IRTs 9 are mounted in the ceiling of the factory or on one of the processing tools 10. The system also includes a plurality of transportable containers which, during manufacture, are moved to various points within the factory. Each of these containers is equipped with a microterminal 12 specifically designed and adapted for infrared communication with the IRTs 9 within the factory. Given this arrangement, messages can be sent through the system controller 6 and IRTs 9 to the microterminals 12 from the server 2, any of the client applications 4, or the CIM terminal 3 attached to the local area network 1.

Figure 2:
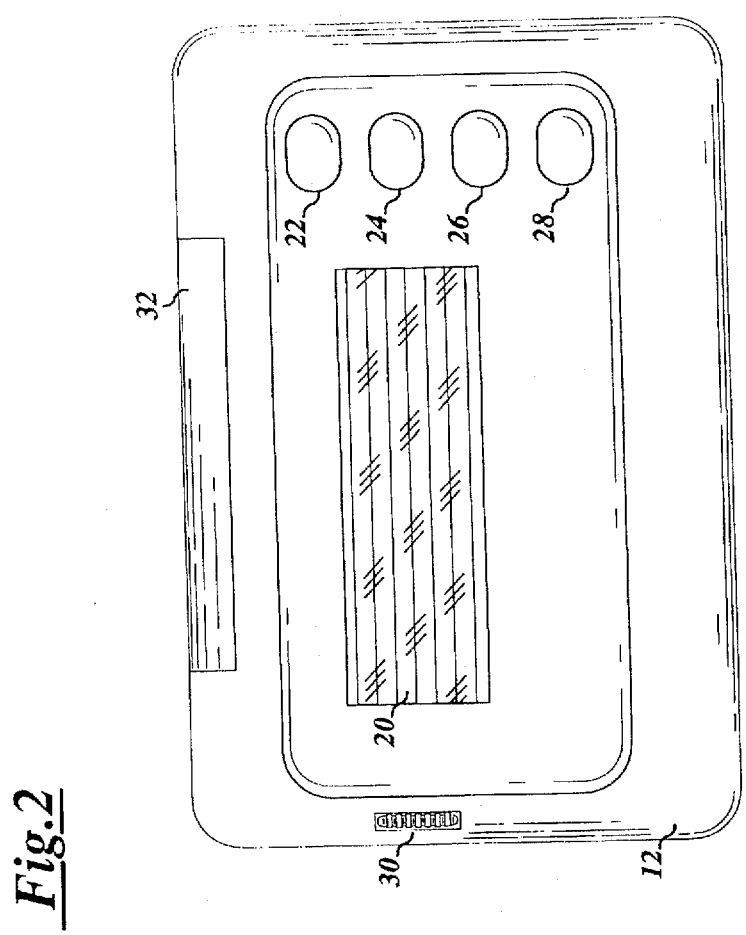
FIG. 2 is a drawing of the exterior of the microterminal of the present invention.

FIG. 2 shows the exterior of microterminal 12. As shown, it includes a liquid crystal display 20, four push buttons 22, 24, 26 and 28, a beeper 30, and a lens 32 for the microterminal's IR light generator and detector.

The design of the microterminal 12 allows it to perform many different functions. Its primary purpose is to serve as a portable, wireless, electronic terminal, the use of which allows workers in the factory to communicate with the LAN 1. The microterminal 12 uses modulated infrared light as a communication medium and is capable of receiving and displaying text and graphic information from the LAN 1 on its display 20. The microterminal 12 is capable of transmitting information related to its identity and status as well as operator responses entered on one of four push button switches 22–28. The microterminal 12 is also capable of storing text messages and graphic images and to recall them to the display 20 on operator demand. To attract the operator's attention, the microterminal 12 can also generate audible signals using beeper 30. Still another important function of the microterminal 12 is its ability to provide location information to help operators locate, for example, a container to which the microterminal 12 is attached.

Figure 3:
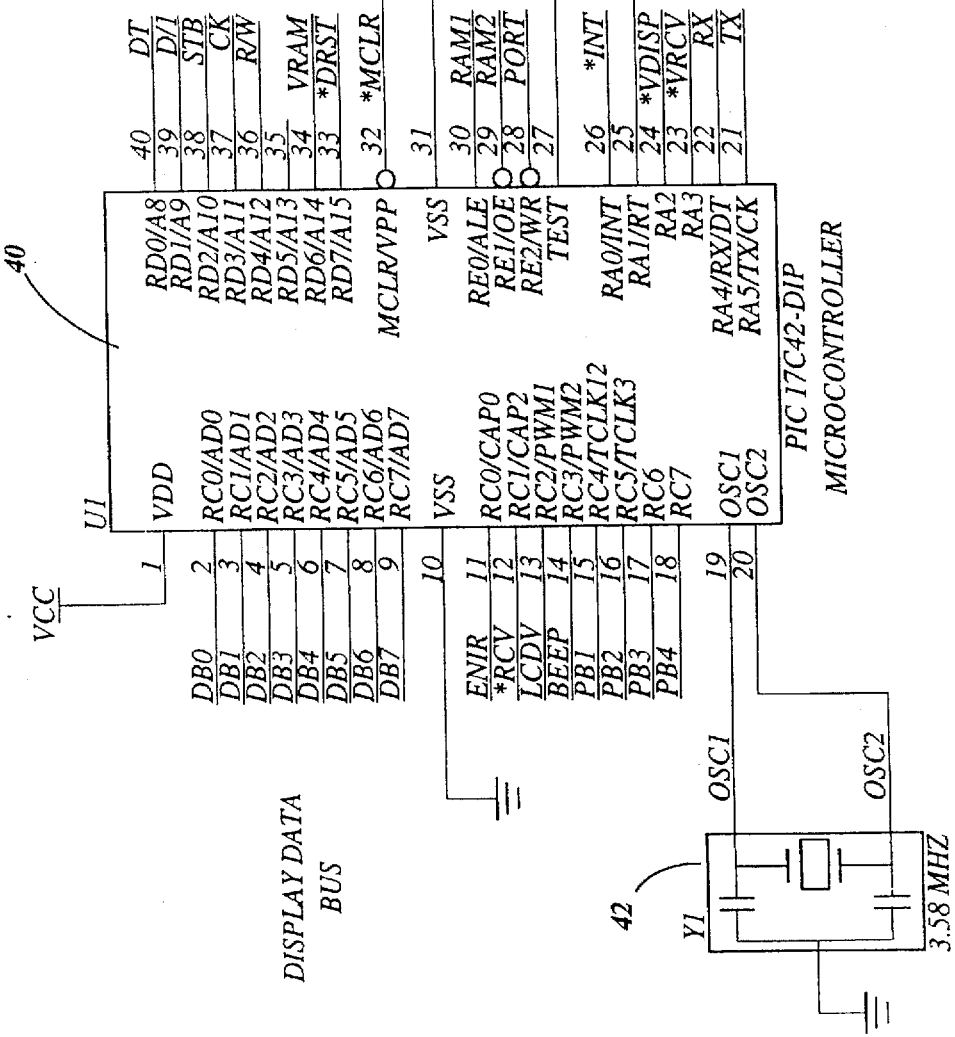
FIG. 3 is a schematic of the controller circuit of the microterminal shown in FIG. 2.

The electronic systems of the microterminal 12 will now be discussed with reference to FIGS. 3–13. As shown in FIG. 3, the microterminal 12 includes a CMOS microcontroller 40, a 3.579545 MHZ internal oscillator 42 under resonator control for accurate timing and data generation, and a motion sensor 44. The CPU also has firmware to control all functions and operations of the microterminal.

Figure 4:
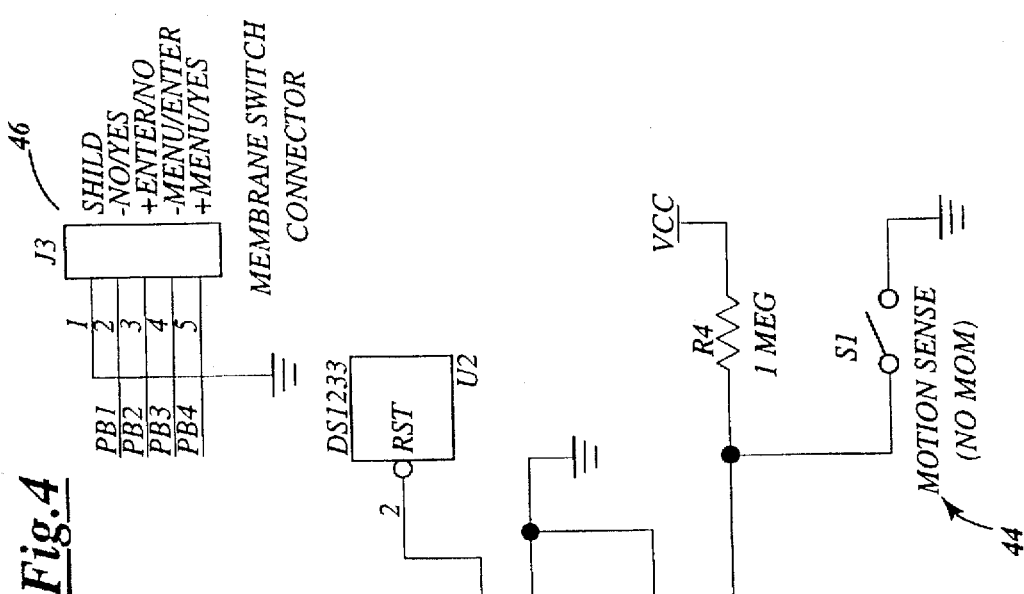
FIG. 4 is a schematic diagram of the connector used to connect the switches of the microterminal to its control circuit.

FIG. 4 shows a jack 46 to which the four membrane switches 22–28 are attached. Jack 46 provides inputs to the microterminal 40 through pins 15–18 of the microcontroller 40 (i.e., PB1–PB4) shown on the left-hand side of the microcontroller in FIG. 3.

Figure 5:
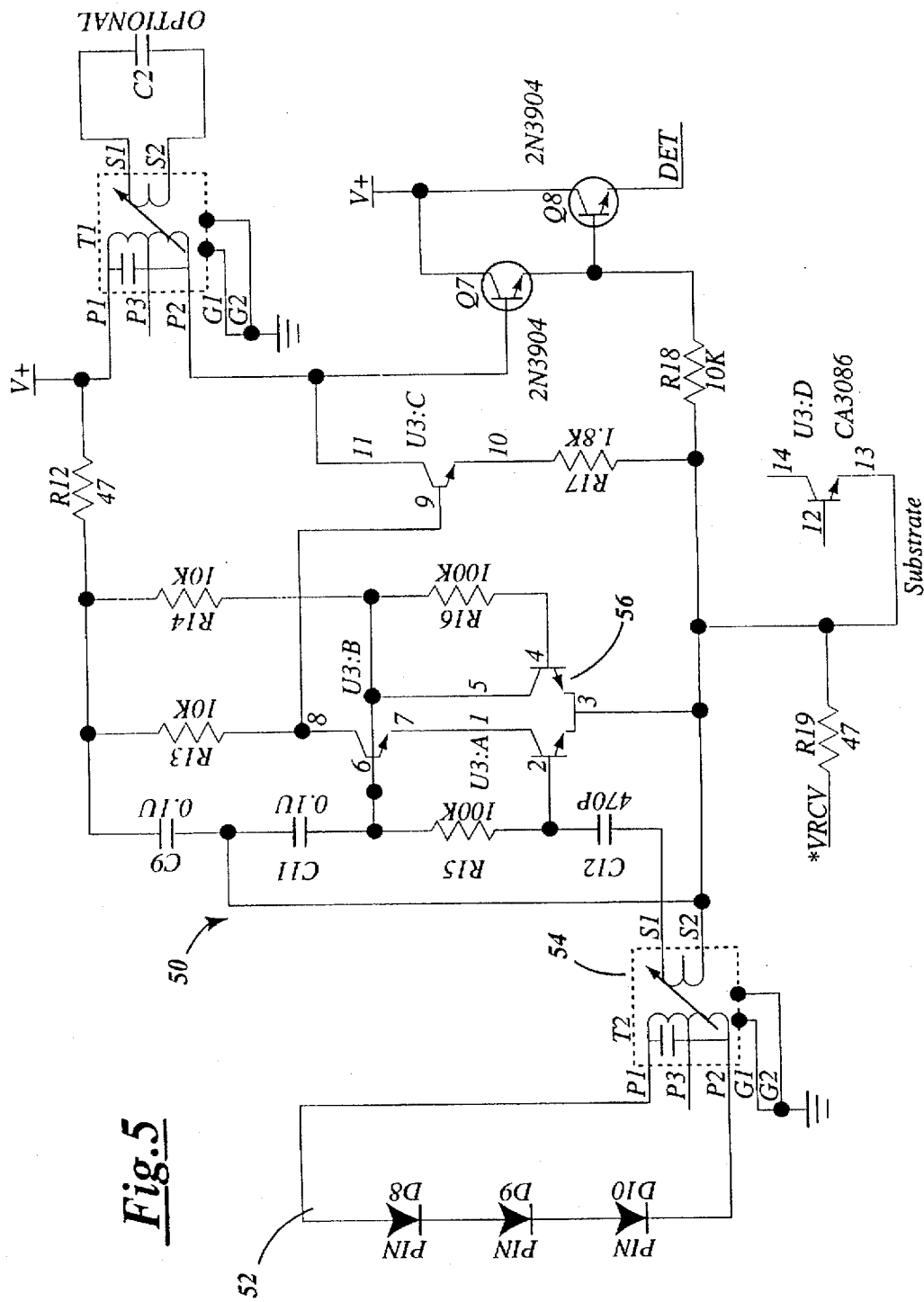
FIG. 5 is a schematic diagram of the infrared receiver of the microterminal shown in FIG. 2.
Figure 6:
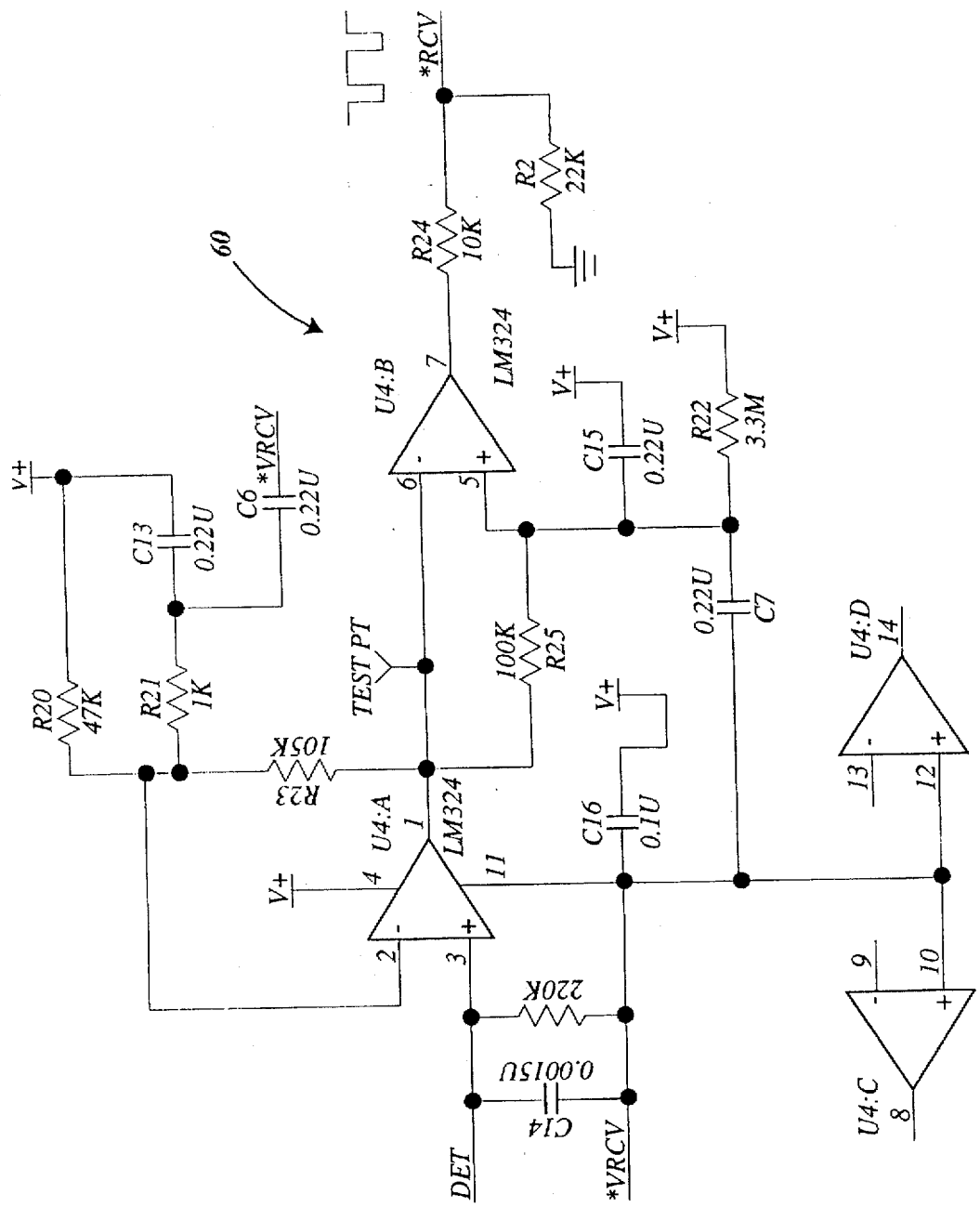
FIG. 6 is a schematic diagram of the infrared demodulator of the microterminal shown in FIG. 2.
Figure 7:
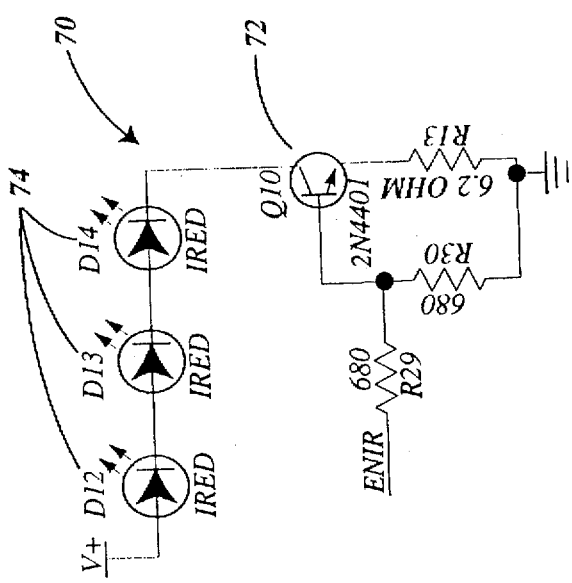
FIG. 7 is a schematic diagram of the infrared transmitter of the microterminal shown in FIG. 2.
Figure 8:
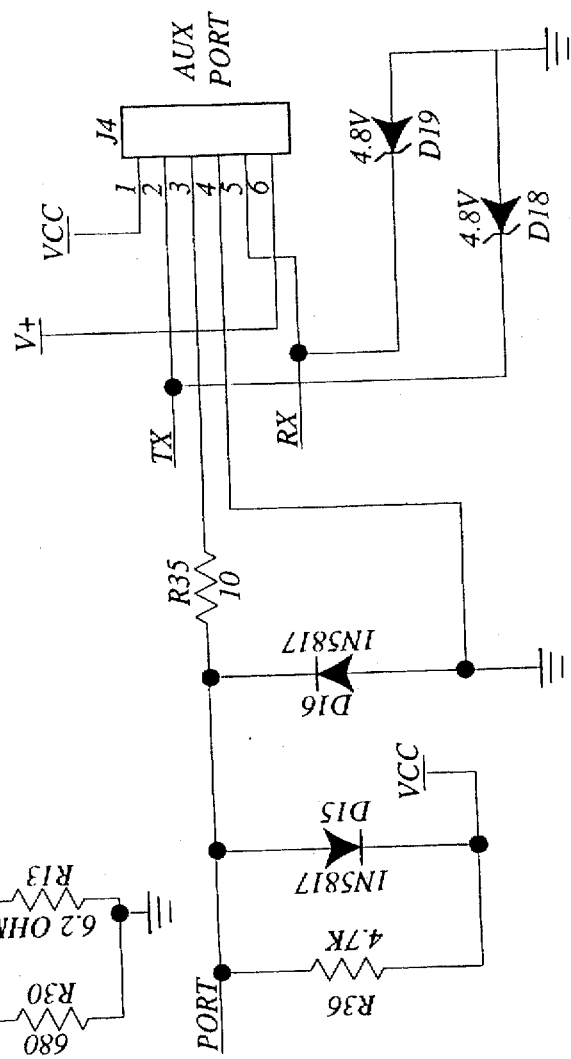
FIG. 8 is a schematic diagram of the auxiliary port which can be used to communicate data to the controller of the microterminal shown in FIG. 2.

FIG. 5 shows the infrared receiver 50 of the microterminal. It includes three photo detectors 52, a transformer 54, and a differential amplifier 56 which compares the output of the transformer with a known value. Output from the infrared receiver is fed to an infrared demodulator 60 shown in FIG. 6. The output of the demodulator circuit is then fed into the microcontroller 40 via the microcontroller's input pin 12 (+RCV).

To achieve the desired advantages of the present invention, the microterminal 12 must also be used to transmit infrared signals. The microterminal 12, therefore, includes an infrared transmitter 70 (see FIG. 7). The transmitter 70 receives instructions from the microcontroller 40 via the microcontroller's pin 11 (ENIR). The ENIR signal from pin 11 opens or closes switch 72 to modulate the output of LEDs 74.

From time to time, it may be deemed necessary to communicate directly with the microterminal 12 without using infrared light. For this reason, an auxiliary port (for example, an RS232 serial port) is provided. See FIG. 8. This port is connected to the microcontroller 40 via pin 28 (port) on the microcontroller 40.

Figure 9:
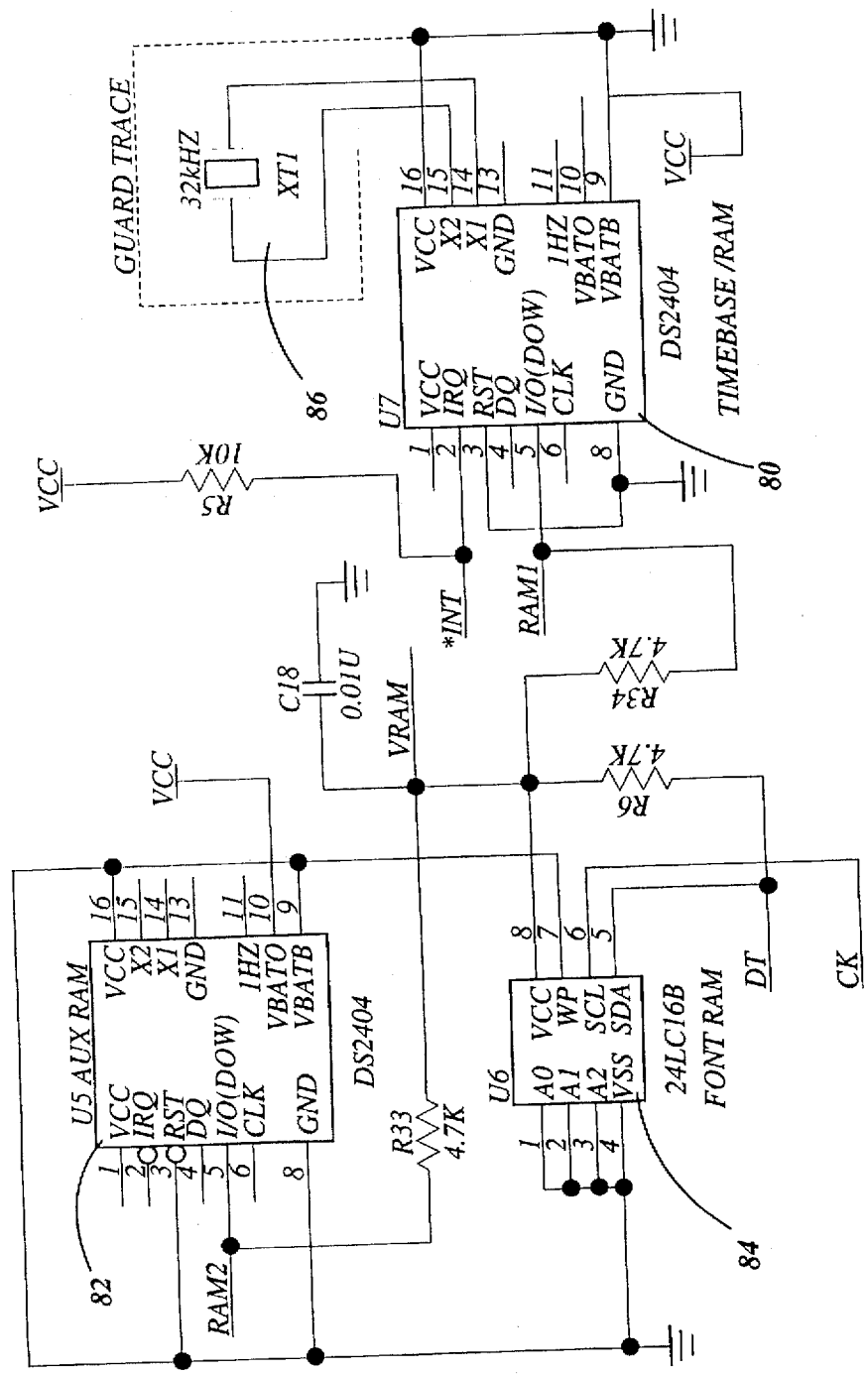
FIG. 9 is a schematic diagram of the auxiliary memory and timing circuit of the microterminal shown in FIG. 2.
Figure 13:
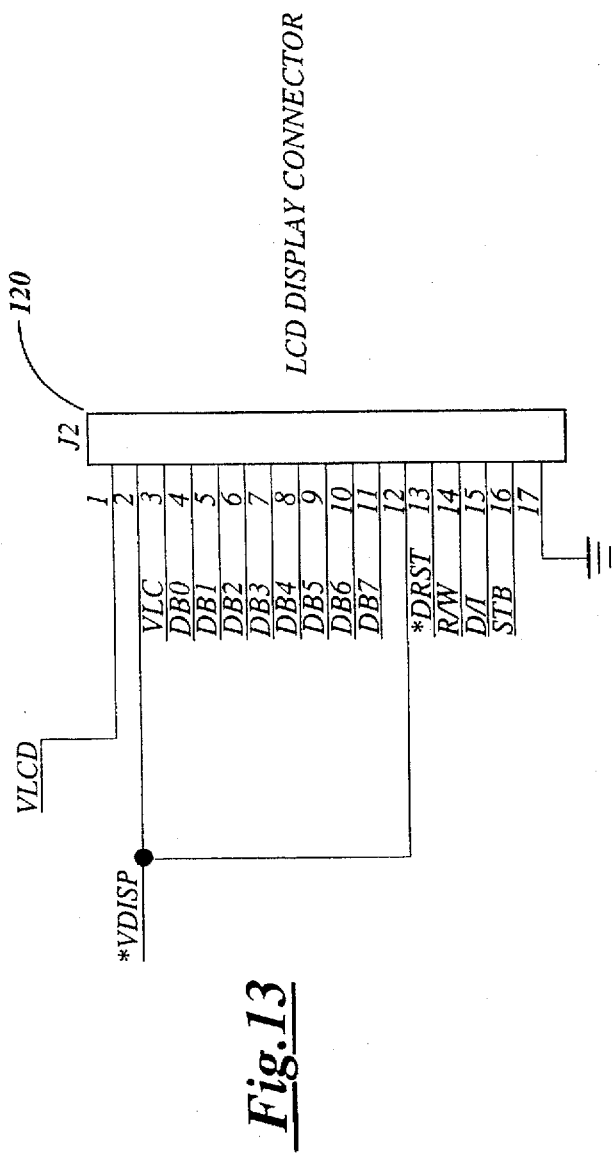
FIG. 13 is a schematic diagram of the LCD display connection of the microterminal shown in FIG. 2.

In addition to the on-board memory of the microcontroller 40, the microterminal includes three other RAM memories 80, 82 and 84. These are shown in FIG. 9. Memory 80 is referred to as time base RAM because the information stored therein is principally used for timing and execution of the instructions contained in the firmware. Information is transmitted between RAM chip 80 and the microcontroller 40 via the microcontroller's pin 30 (RAM1). The auxiliary RAM chip 82 is provided to store messages to be displayed and the like. RAM chip 82 communicates with the microcontroller 40 via the microcontroller's pin 29 (RAM2). The primary function of RAM memory 84 is to store font information for display purposes. It communicates with the microcontroller 40 via the microcontroller's pins 37 (CK) and 40 (DT).

The beeper 30 is also controlled by the microcontroller 40. Pin 14 (Beep) of the microcontroller 40 is used to send control signals to the beeper causing it to sound. See FIG. 10.

Power processing of the microterminal 12 is handled by the circuit shown in FIG. 11. The power processing circuit 90 includes a pair of battery connect wires 90 and 92 and is used to power the LCD display 20, the microcontroller 40, as well as the remaining components of the microterminal. The contrast of the LCD display 20 is controlled by the circuit 100 shown in FIG. 12.

The display 20 is connected to the microcontroller 20, the LCD contrast control circuit 100 and the power processing circuit 90. This is all done through jack 120 shown in FIG. 13. More specifically, the jack 120 is connected to pins 2–9 (DB0–DB7), 24 (VDISP), 33 (DRST), 36 (R/W), 38 (STB) and 39 (D/I) of microcontroller 40. Pin 3 of jack 120 is connected to the output of LCD contrast control circuit 100 shown in FIG. 12 and power is provided to the display via output VLCD of the power processing circuit 90 shown in FIG. 11.

The display 20 was specifically chosen to reduce energy consumption. Hence, it is a liquid crystal 32 row by 128 column display. It is capable of displaying 21 characters per line. The display 20 has its own volatile read/write memory and also has a non-volatile serial read/write memory to hold data necessary to translate character codes into display-ready font images. This display also holds some graphic images as well as a variety of text messages which can be displayed. Finally, the display 20 contains a voltage inverter system driven by the microcontroller 40 to generate negative voltage potentials required to activate the LCD pixels.

The IR receiver 50 of the microterminal 20 uses high speed infrared technology to detect and decode 447 kilohertz modulated IR signals at 880 nanometer wavelengths. The conical acceptance angle of the IR receiver is 80° from vertical. The IR receiver is surrounded by a cover 32 that is 95% transparent to IR energy at 880 nanometer wavelengths. Given this configuration, the IR receiver has a range of approximately 20 feet.

The microterminal's IR transmitter 70 is a current mode, high speed, high efficiency, 880 nanometer IR transmitter. The transmitter is pulse modulated at 447 kilohertz by serial data encoded in the pulse position modulation (PPM) format. The transmitter has an 80° radiation angle and generates light energy using three semi-conductor devices 74.

The user input system of the microterminal includes four switches 22, 24, 26 and 28. Each of the four switches are momentary contact, conductive rubber push button switches. Each is able to signal the microterminal 20 to generate messages which are then sent to the IRTs 9 through the infrared transmitter 70 of the microterminal 12. The microterminal 12 provides an audible chirp through beeper 30 with each button press. This chirp is generated by the microterminal 40 and, thus, provides positive user feedback that the signal has been sent.

The power management system (See FIG. 11) of the microcontroller 40 includes two lithium thionyl chloride batteries in an AA cell Form Factor. Each cell has the capacity of 2100 milliampere-hours at nominally 3.6 volts. The power management system includes circuit protection against a reversal as well as power filtering and power conditioning. The microcontroller 40 of the microterminal 12 is capable of monitoring battery status so that low battery conditions can be reported to both the display 20 and the factory's central control computer (file server) 2. While the batteries of the microterminal 12 are not rechargeable, they are replaceable.

The microterminal 12 includes a unique timing system which is specifically designed to extend battery life. The timing system, which will be described in further detail below, causes the main processing unit to enter a power-down sleep mode for extended periods of time. The timing system includes a 32,768 hertz ceramic resonator 86 (see FIG. 9) which activates the microcontroller 40 of the microterminal at pre-defined intervals for routine processing.

The self-test subsystem of the microterminal performs basic memory and data checks on power up. It also uses the display 20 to report error conditions. If the display 20 is not operable, a series of beeps can be generated using beeper 30 to report errors. For example, the microterminal 12 will generate two beeps if the first RAM memory 80 is not responding. Three beeps are reported if the first RAM 80 is not returning correct data. If four or five beeps are generated, this is an indication that there is a problem with the second RAM memory 82. Four beeps means that the RAM is not responding at all. Five beeps means that the RAM is not returning correct data. Finally, six beeps indicates a failure in the font RAM 84.

As suggested above, the operation of the microterminal 12 is controlled by firmware placed in the microterminal's microcontroller 40 at the time the microterminal 12 is manufactured. General parameters related to operation of the microterminal 12 will now be described.

Each microterminal 12 is provided with a unique ID number that is stored in non-volatile memory. The ID number is used to uniquely identify the microterminal, to selectively direct data from the system controller 6 to the microterminal 12, to determine the microterminal's location, and is used by the system controller 6 to determine the source of data received from the microterminal. In the preferred embodiment, these identification numbers are 16 bit allowing 65,535 unique ID numbers to exist in a single system. The microterminals 12 also have a site code which is used to differentiate microterminals among 256 distinct sites or subsystems, providing 16 million unique microterminal designations.

The location of the microterminals 12 can be effectively tracked because each room or distinct area within the factory is equipped with its own IRT 9. The IRTs 9 are designed to send out beacons which contain a unique ID number. The microterminals 12 use the IRT's ID number in the beacon to determine whether the microterminal 12 has been physically moved since it received the last beacon. When the microterminal 12 determines that it has changed locations, it reports to the central control system that it has moved to a new location through an infrared transmission to the IRT 9. Reports by the microterminals 12 are continued in randomized fashion until the central control system acknowledges receipt of the location report. The maximum rate for the location reports is typically once every four seconds for each microterminal.

An important feature of the present invention is the technique used to control the microterminal 12 to increase battery life. As indicated above, the microterminal 12 has four modes of operation: a stand-by mode, an operate mode, a power saving mode and an extended sleep mode. The majority of the time, the microterminals 12 remain in the low power stand-by mode. The microterminals 12 are activated periodically to check their location and see if messages for the tag are being generated by the system controller 6. The microterminals 12 can be also be activated by actuation of a push button switch (22, 24, 26 or 28) by one of the workers in the factory or by motion sensor 44 if physical motion greater than 0.2 g occurs. When activated i.e., placed in the operate mode), the microterminal 12 only remains active for interactive operation with the system controller 6 until sufficient time without changes has transpired. The microterminal 12 then reverts to back to the power saving stand-by mode.

When the microterminal 12 enters the operate mode, the microcontroller 40 is awakened, and the display 20 and IR receiver 50 are powered. In this state, the microterminal 12 is ready to interact with the system controller 6 of the central control system. In the operate mode, a variety of things can occur. First, the microterminal 12 is able to receive messages for display. The tag is also able to display the memory contents as requested by the user. Finally, the microterminal 12 is able to generate transmission of user responses.

When a microterminal 12 receives a message sent to it by the central control system, it looks for certain information embedded in the message. Embedded in the message, for example, is an instruction to display the message on the liquid crystal display 20 or store the message in display memory. Commands and the message can also activate the microterminal's beeper 30 or invoke the display of preprogramed textual or graphic messages stored in the display's non-volatile memory. When the microterminal 12 receives a system message, the microterminal issues a short response message which serves as an acknowledgment.

All messages sent to the microterminal 12 include a sequence number which is returned as a validation of receipt. The sequence number is also used to prevent duplication. The central controller will continue to transmit messages through the system controller 6 and IRT 9 until an acknowledgment is returned by the microterminal 12. This greatly improves reliability of the data path to the microterminal 12.

Messages received by the microterminal 12 from the central controller can also contain a control code which causes the microcontroller 12 to enter a "query" mode. When in this mode, a cursor flashes on the display 20 and buttons 22 and 24 on the microterminal 12 can be used to generate messages "yes" and "no". If, for example, a factory worker presses button 22, a corresponding "yes" message is sent by the microterminal 12 to the central controller until an acknowledgment is received. When the acknowledgment is received from the central controller, the microterminal 12 leaves the query mode so that the buttons 22, 24, 26 and 28 can be used to scroll the display 20. The user can use the buttons to scroll the display anytime that the microterminal 12 is not in the query mode. Likewise, when the microterminal 12 is in the stand-by mode, actuation of the one of the buttons 22, 24, 26 or 28 will cause the microterminal 12 to switch to the operate mode. Subsequent button presses will scroll the display. After a period of time without activity, the microterminal 12 again returns to the stand-by mode.

In addition to the stand-by and operate modes, the microterminal 12 also has a power saving mode. The microterminal automatically enters this mode when no beacon message is observed by the microterminal 12 for 60 seconds. Initially, the microterminal will wait to look for a beacon every 5 seconds. Over time, this five second interval is increased incrementally to a maximum of 4.2 minutes. The microterminal 12 will revert to the stand-by or operate mode if there is physical motion of the microterminal, a button is pressed or, a beacon is received.

Finally, the microterminal 12 has an extended sleep mode. This mode is intended for use by microterminals that are being placed into storage. Microterminals 12 in this mode do not wake up or receive beacons. Only a press of button 22, 24, 26 or 28 will return the microterminal 12 to operation. This mode can only be invoked by a special infrared message issued to the microterminal by the central controller.

Now that the microterminals 12 have been described in sufficient detail, the infrared transceivers (IRTs) 9 will be described.

To reiterate, each IRT 9 is a fixed element in communication with the portable microterminals 12. The IRTs 9 are used by the central controller to perform both tracking of and communications with the microterminals 12. The IRTs 9 have a small plastic and aluminum enclosure which is designed to be inserted into existing ceiling raceways in place of the section of the raceway cover. The IRTs 9 have a dual pivot system for aiming and can have either a flood or spot type configuration.

Figure 14:
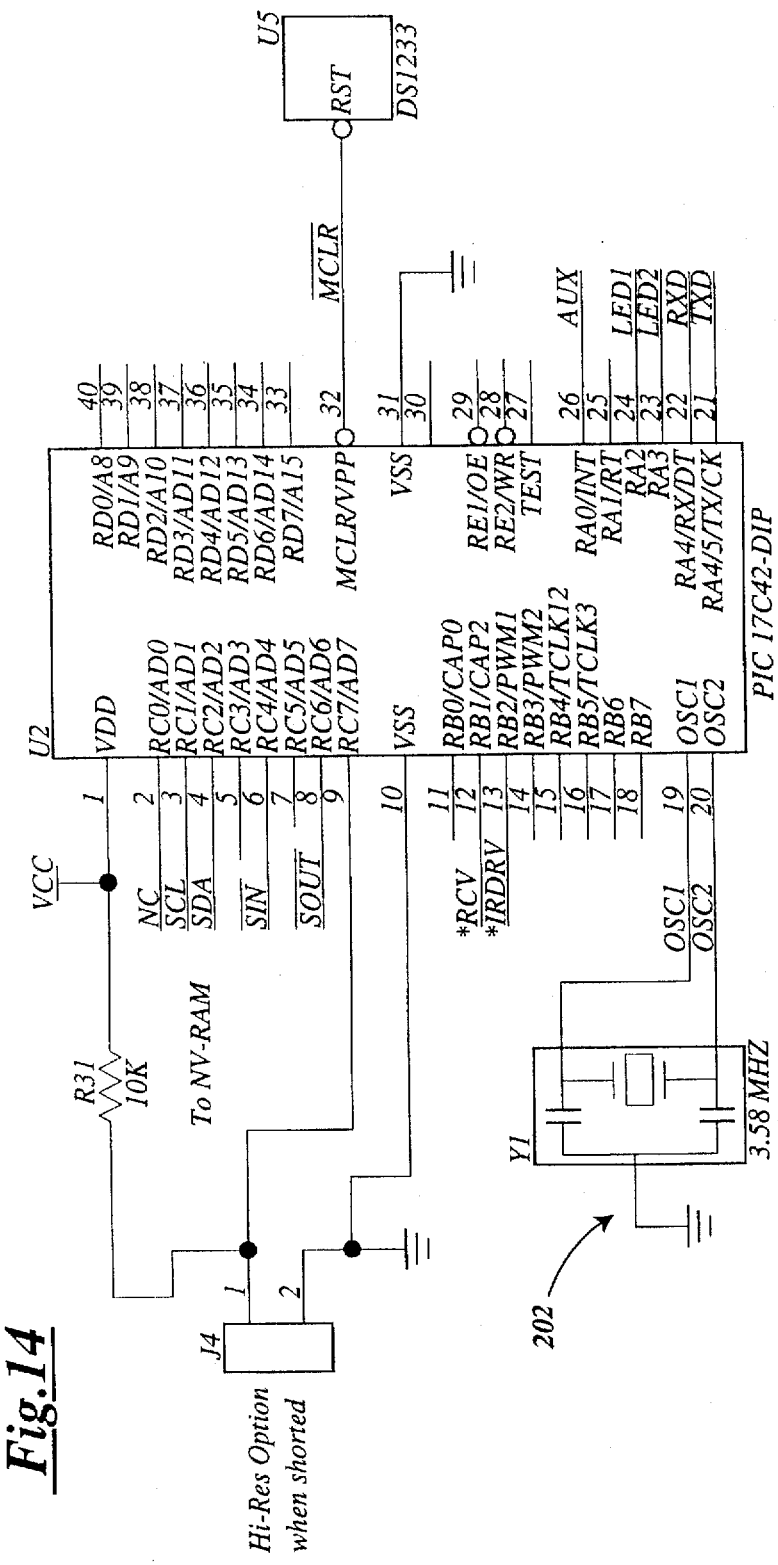
FIG. 14 is a schematic diagram of the control circuit for the infrared transceivers of the present invention.

FIG. 14 shows the microcontroller 200 of the IRT 9. The microcontroller 200 includes a 3.579545 MHZ internal oscillator 202 under resonator control. Attached to the microcontroller 200 using pins 2–4 (NC, SCL and SDA) is a non-volatile memory module 204 shown in FIG. 15. FIG. 16 show the auxiliary input jack and circuit 206 which is connected to the microcontroller 200 using pin 26 (AUX).

Figure 18:
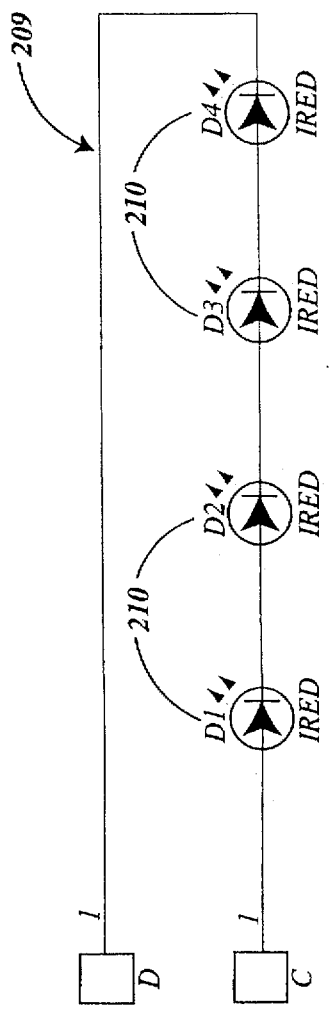
FIG. 18 is a schematic diagram of the infrared emitter array of the infrared transceiver.

So that signals can be sent from the IRT 9 to the microterminals 12, the IRTs 9 each include a IR emitter driver 208 shown in FIG. 17 and a IR emitter array 209 shown in FIG. 18. The IR emitter driver 208 receives inputs via pin 13 (+IRDRV) from the microcontroller 200 and processes these inputs to control the four semiconductor devices 210 of the IR emitter array 209.

Figure 19:
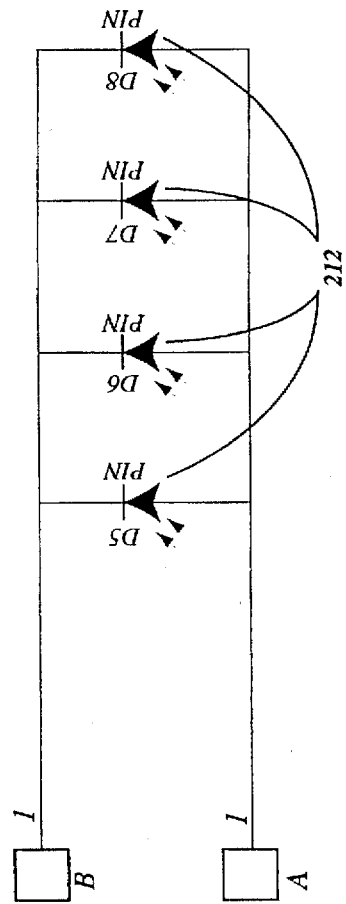
FIG. 19 is a schematic diagram of the infrared detection circuit of the infrared transceiver.
Figure 20:
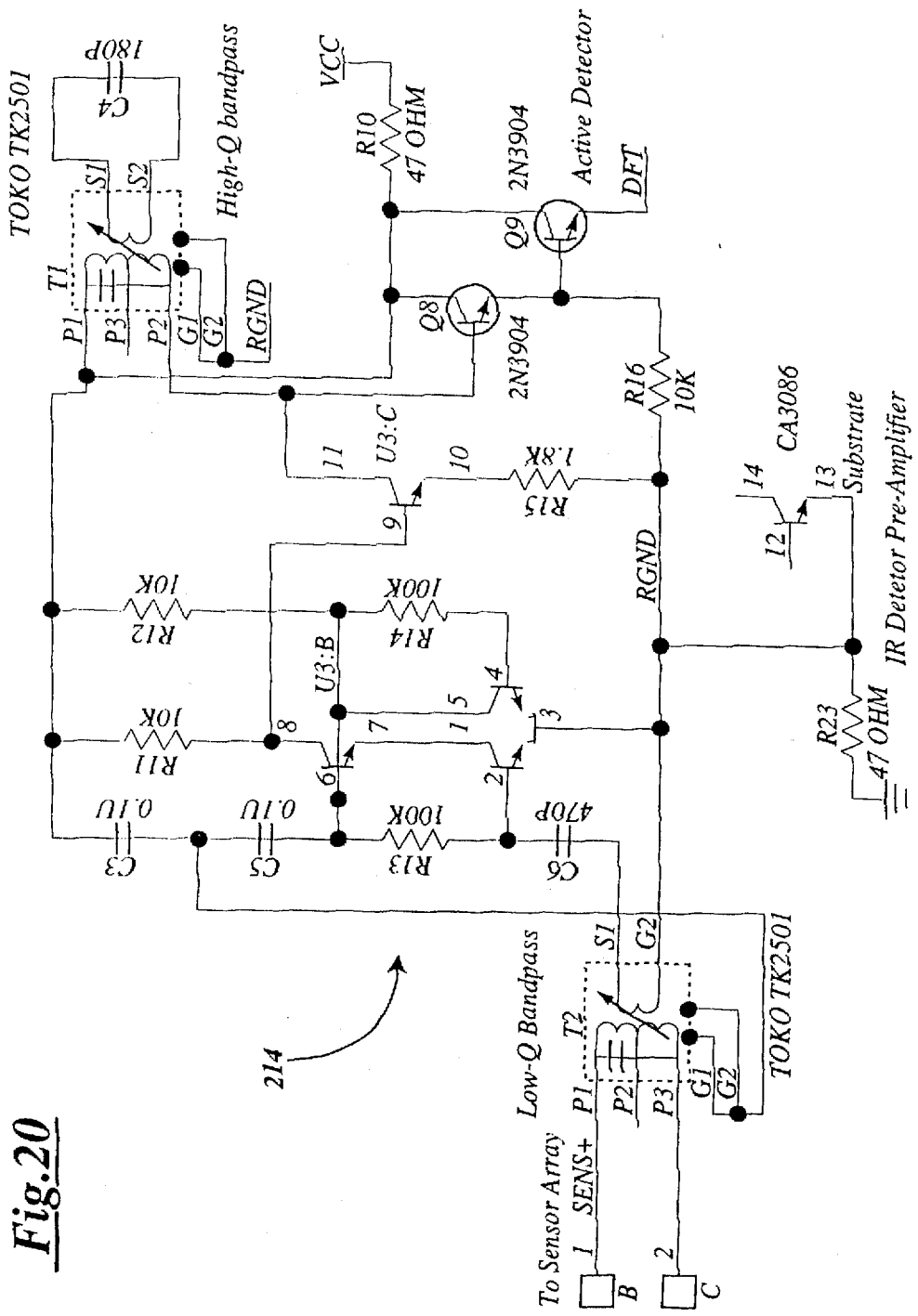
FIG. 20 is a schematic diagram of the infrared detection pre-amplifier of the infrared transceiver.

Signals coming back to the IRT 9 from the microterminal 12 are detected by four sensors 212 shown in FIG. 19. Each of these sensors 212 is coupled to an IR detector pre-amplifier 214 shown in FIG. 20. The output of pre-amplifier 214 is provided to the circuit 216 shown in FIG. 21 which performs both detector gain and demodulation of the IR signal. The output of circuit 216 is provided to the microcontroller 200 via pin 12 (*RCV).

As will be explained in further detail below, each IRT 9 is provided with a pair of light emitting diodes—LEDs 218 and 220 shown in FIG. 22. The microcontroller 200 lights these LEDs to provide a visual indicator of the operations being performed by the IRT 9. Connection of the LEDs to the microcontroller 200 is through pins 24 (LED1) and 25 (LED2) of the microcontroller 200.

Figure 23:
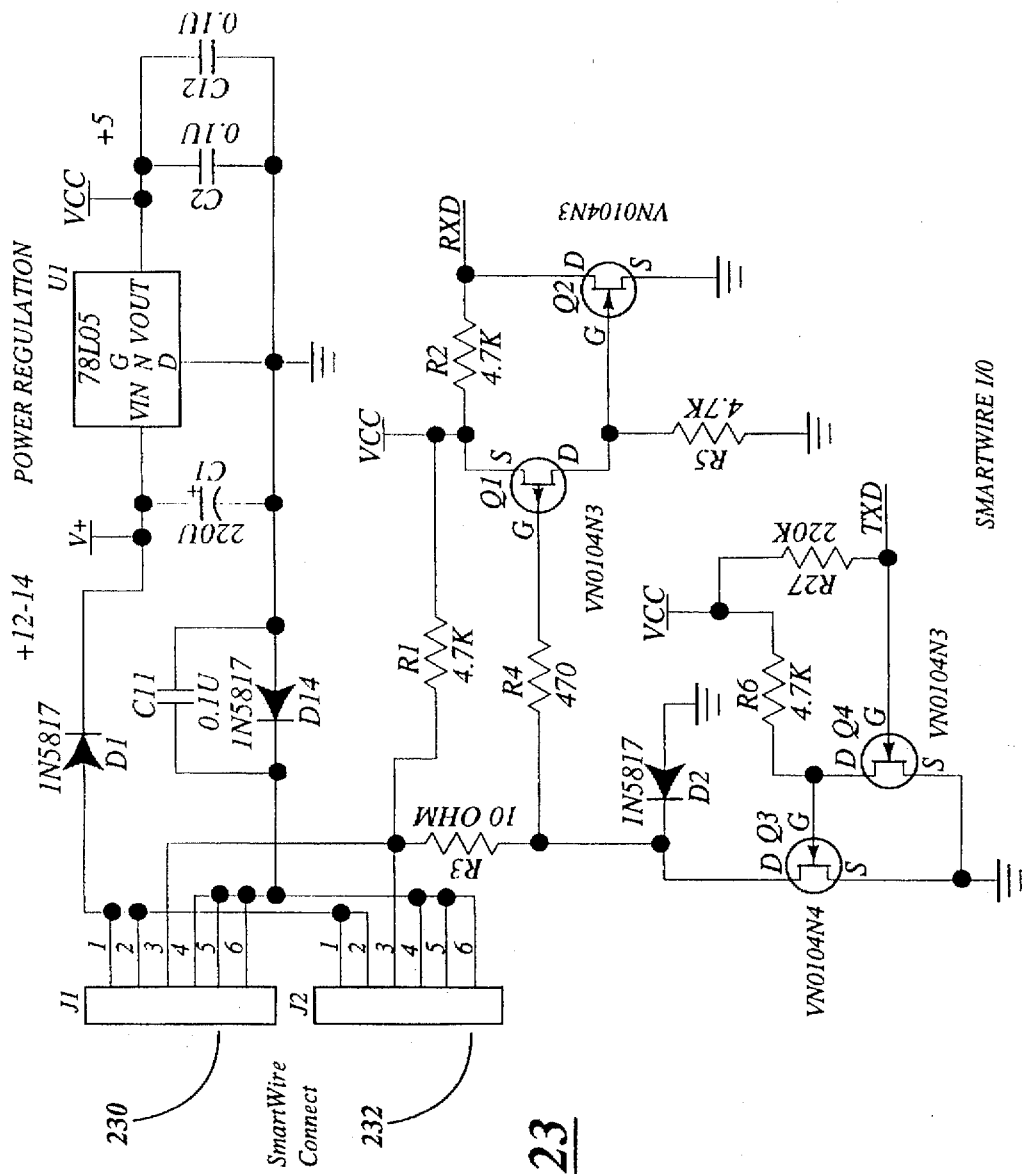
FIG. 23 is a schematic diagram of the circuit used by the infrared transceiver to process inputs from and outputs to the system controller of the present invention.

FIG. 23 is present to show the manner in which the IRT 9 processes inputs from and outputs to the system controller 6. The circuit shown in FIG. 23 is connected to the microcontroller 200 via microcontroller pins 21 (TXD) and 22 (RXD). Two connectors 230 and 232 are provided. Each is a RJ-45 female connector. Two are provided so the IRTs 9 can be daisy chained together for ease of installation. From the foregoing it should now be clear that each IRT 9 can perform infrared data modulation and demodulation and participate in an infrared communications protocol to handle communications between the central control system and the microterminals 12 in the field of view. The IRTs 9 also provide buffering of data and data exchange on interconnecting wires through a collision-based protocol.

Figure 24:
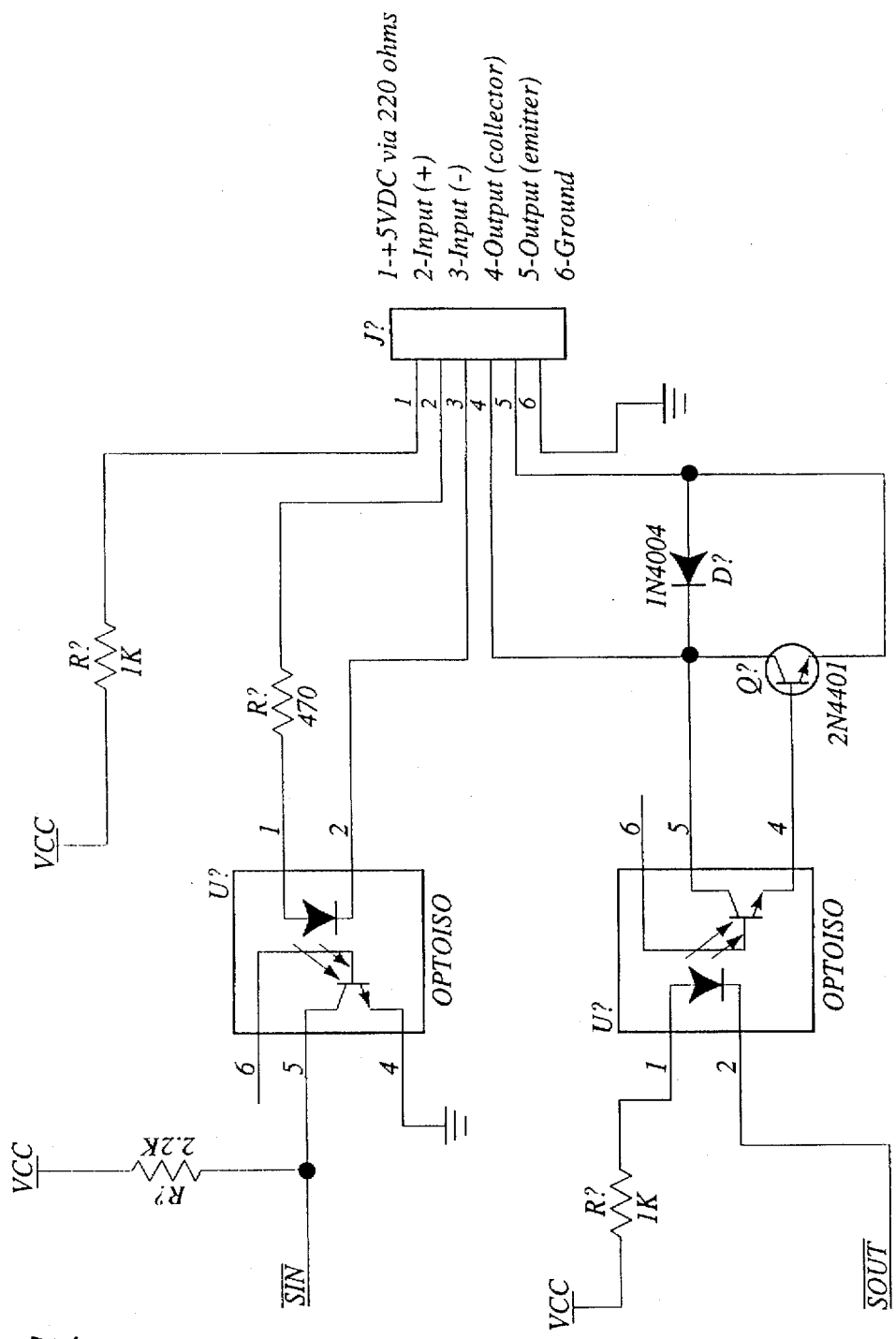
FIG. 24 is a schematic diagram of the noise suppression circuit of the infrared transceiver.

The three basic functions of the IRTs 9 are to provide data reception and demodulation, data modulation and transmission, and wired reception and transmission of data with the local area network. When data is transmitted by the microterminals 12, it is received and demodulated in accordance with the specific protocol by the IRTs 9. The IRTs also buffer the messages for transmission onto the wire data network and provide blanking periods and noise masking to discern legitimate signals from background noise. See FIG. 24. To ensure proper communications, the IRTs 9 perform a number of tests on any transmission. For example, the IRT 9 performs a longitudinal cyclic redundancy check to validate data received or to reject a message when the test fails. It also performs an 8-bit fixed format test to validate or reject messages. The IRT also provides longitudinal byte count validation against a length embedded in each message.

Still another function of the IRT is to buffer inbound IR data for transfer to the network, stripping the messages of unnecessary control and check bytes. LEDs 218 and 220 on the IRT 9 provide an indication of successful or failed data reception and the IRT is designed to provide protection from buffer overrun to prevent receiver overload. The microcontroller 200 of the IRT 9 can also be disabled when requested by the central control system.

The IRTs perform similar functions with data sent to the microterminals 12. Specifically, it modulates and transmits the IR signals to the microterminals 12 and transmits specially formed beacon messages every four seconds. Every beacon messages begins within 0.001 seconds of a four second clock with a time base accuracy better than 200 parts per million. Beacon messages may optionally be accompanied by messages from the central control system to microterminals 12 in the stand-by mode. As beacon messages are transmitted, an LED indication of beacon transmission is provided and the IRT locks out its IR receiver system.

In performing the function for providing a gateway for communication between the microterminals 12 and the central control system, the IRTs 9 are also capable of providing wired network data reception and transmission. Specifically, the IRTs perform serial data reception of wire data messages from the system controller 6. To provide message validation, the IRTs 9 test the overall message cyclic redundancy check code and test the overall message length against embedded message link values. The IRTs 9 also perform address validation on inbound messages to verify that they are either broadcast messages or intended for that specific IRT 9 by an embedded 16 bit address. The IRTs 9 are also capable of performing circular data buffering of inbound messages based upon type.

Still another function performed as part of reception and transmission with the system controller 6 is optimization of data storage space by removal of overhead and error checking codes on the messages. The IRTs 9 are also capable of providing overrun-error messages to the system controller 6 in the event buffer capacity of the IRT 9 is exceeded. These messages include the sequence number of the discarded messages so that they can be retransmitted.

One very important function performed by the IRT 9 is transmission of messages received from the microterminals 12 and stored in the IRT's demodulator buffer to the central controller via the system controller 6 and the wired network. The system is capable of retransmission of the messages in the event of collision, discarding messages after 256 failed attempts and extinguishing the transmission indicator LED 218 when the message has successfully been sent. Finally, the IRT has a number of data stored in non-volatile memory 204. These include the IRT's symbolic name, priority code, category code as well as operating mode control information.

The basic functions of the IRTs 9 have been discussed above. However, the IRTs also perform several special functions worthy of discussion. First, the IRTs have an "ON" chip independent timing device. The presence of this watchdog timing device ensures proper functionality and recovery from loss of main loop operation lasting more than 2.5 seconds. Second, the IRTs are controlled through the use of interrupt programing to ensure timely processing of data transmitted and received via the wired network. This interrupt programing also ensures interleave of data modulation, data demodulation and serial network transactions. Third, the IRT is capable of responding to a special IRT inquiry from the central control system. The response generated by the IRT includes a 12-character name string, a 16-bit IRT logical identifier, a code indicative of the firmware version, a code indicative of any firmware revisions, a firmware release date string, a single character IRT priority and single byte IRT category mode. Finally, the IRTs include the means to receive specifically coded IR messages and to respond for purposes of alignment and testing of the system.

The electrical system for the IRTs provides several further advantages. With respect to message transmission by the IRTs, each IRT is provided with hardware protection against a firmware failure that could cause damaging currents to flow to the IRT emitters and IRT driver. In fact, the circuit is designed to provide the optimum current-control drive for the infrared emitters to accomplish emitted power of not less than 6 milliwatts per centimeter squared at a wave length of 880 nanometers. This yields a communications range of 18–24 feet with a 90° optical system and 42–50 feet with an 18° optical system.

The IR receiver of the IRTs is designed to provide amplification of not less than 100 Dbv with a bandwidth of not less than 40:1. The receiver also provides protection against signal overload caused by nearby emitters so that there is no loss of reception. Shielding and filtering is provided to protect the electronics from electrical or magnetic interference and a narrow optical band width of not more than 300 nanometers is used to reject interference from ambient light. The receiver also provides high levels of rejection of low frequency (steady-state 60 hertz, and 120 hertz light components) to minimize or eliminate interference from daylight or commercial lighting systems.

Power is supplied to the IRTs from one, two or three network pairs of the wires that connect the cabling that connects the IRT to the system controller. Operating powers not less than 8 volts and not more than 20 volts d.c. and not more than 0.025 amperes per IRT unit. The IRTs are specifically designed to tolerate reversal of one of more network power supply connectors or data pair connections. The IRTs are also provided with sufficient electrostatic discharge protection to prevent damage to other devices attached to the local area network during installation and repair. Inductor-capacitor (L/C) filtering of power and data lines is provided at the connectors to prevent the emission of board noise into the external lead wires and to prevent interference in the IRT from external noise.

The system controller used to link the IRTs to the local area network is obviously a major component of the system. The system controller is essentially comprised of a standard rack frame, one or more IRT interface modules used to connect the IRTs to the controller, and one Ethernet interface module used to connect the system controller to the local area network.

Figure 25:
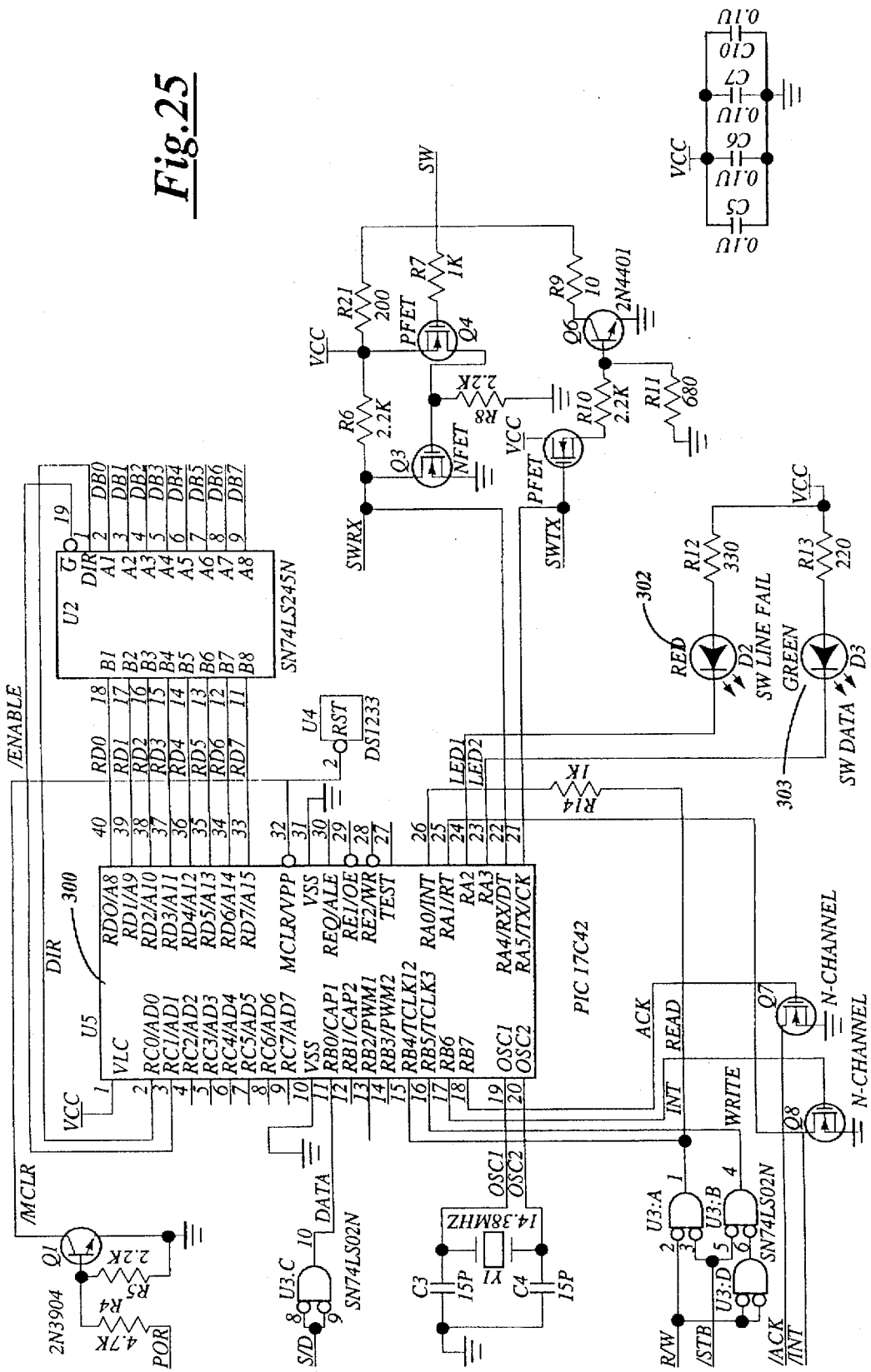
FIG. 25 is a schematic diagram of the control circuit of the interface module of the system controller of the present invention.
Figure 26:
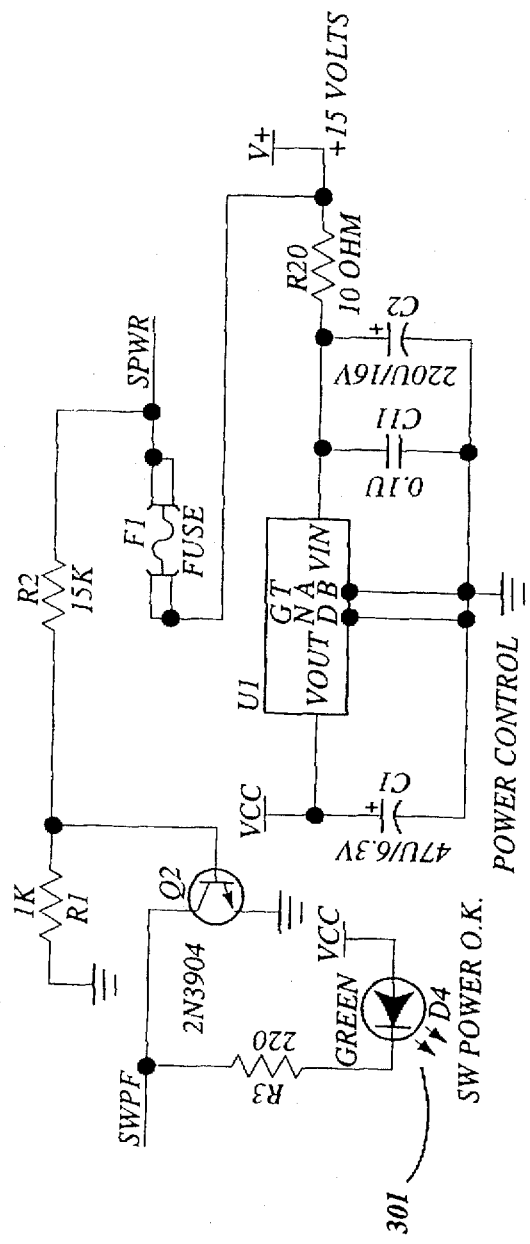
FIG. 26 is a schematic diagram of the power control circuit of this interface module.
Figure 28:
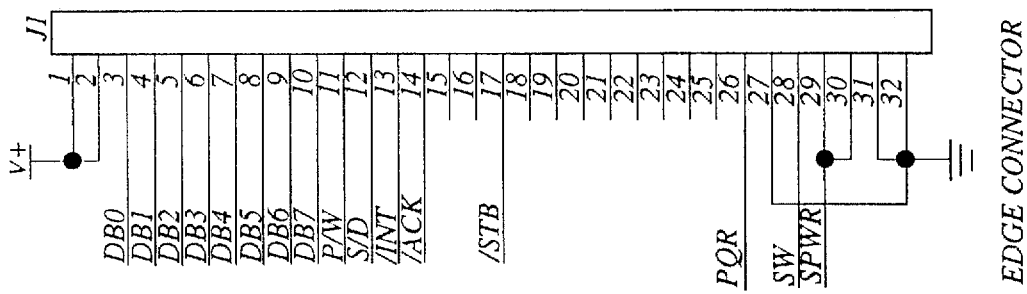
FIG. 28 is a schematic diagram of the connector used to couple the interface module to the rack of the system controller.
Figure 27:
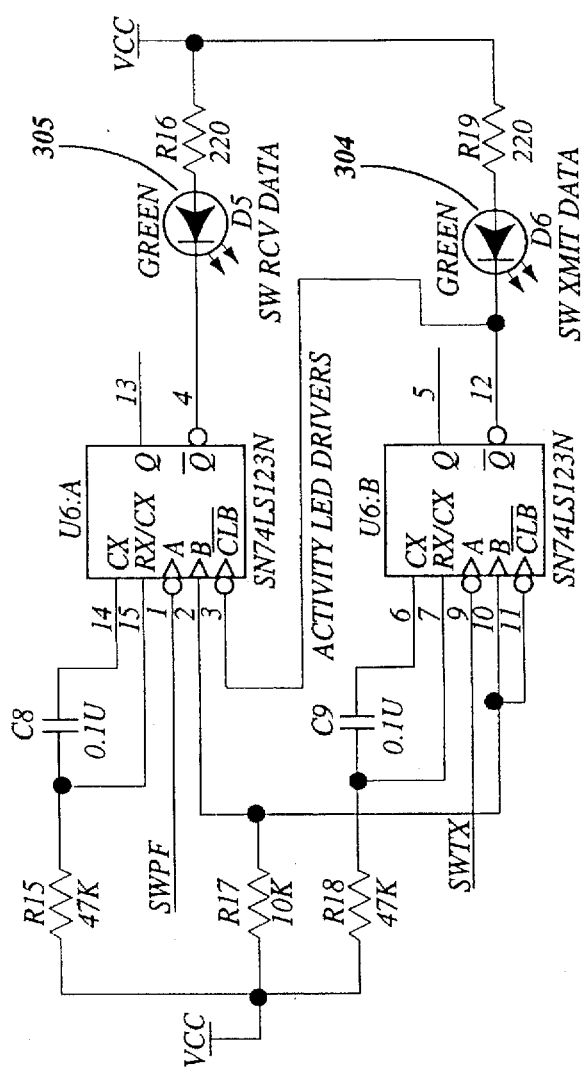
FIG. 27 is a schematic diagram of the driver circuit for the LED activity indicators of this interface module.
Figure 29:
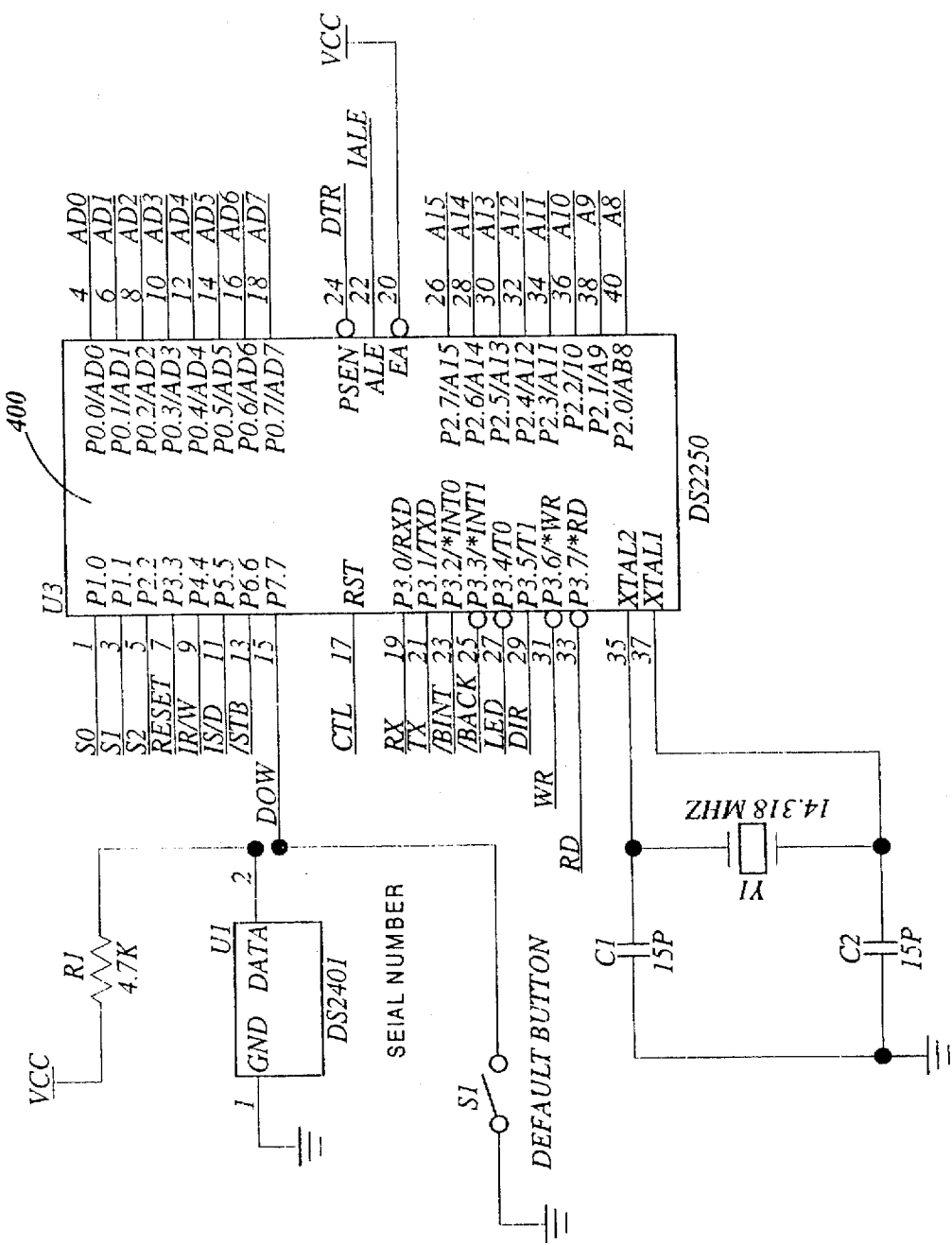
FIG. 29 is a schematic diagram of the control circuit of the Ethernet interface module of the present invention.
Figure 30:
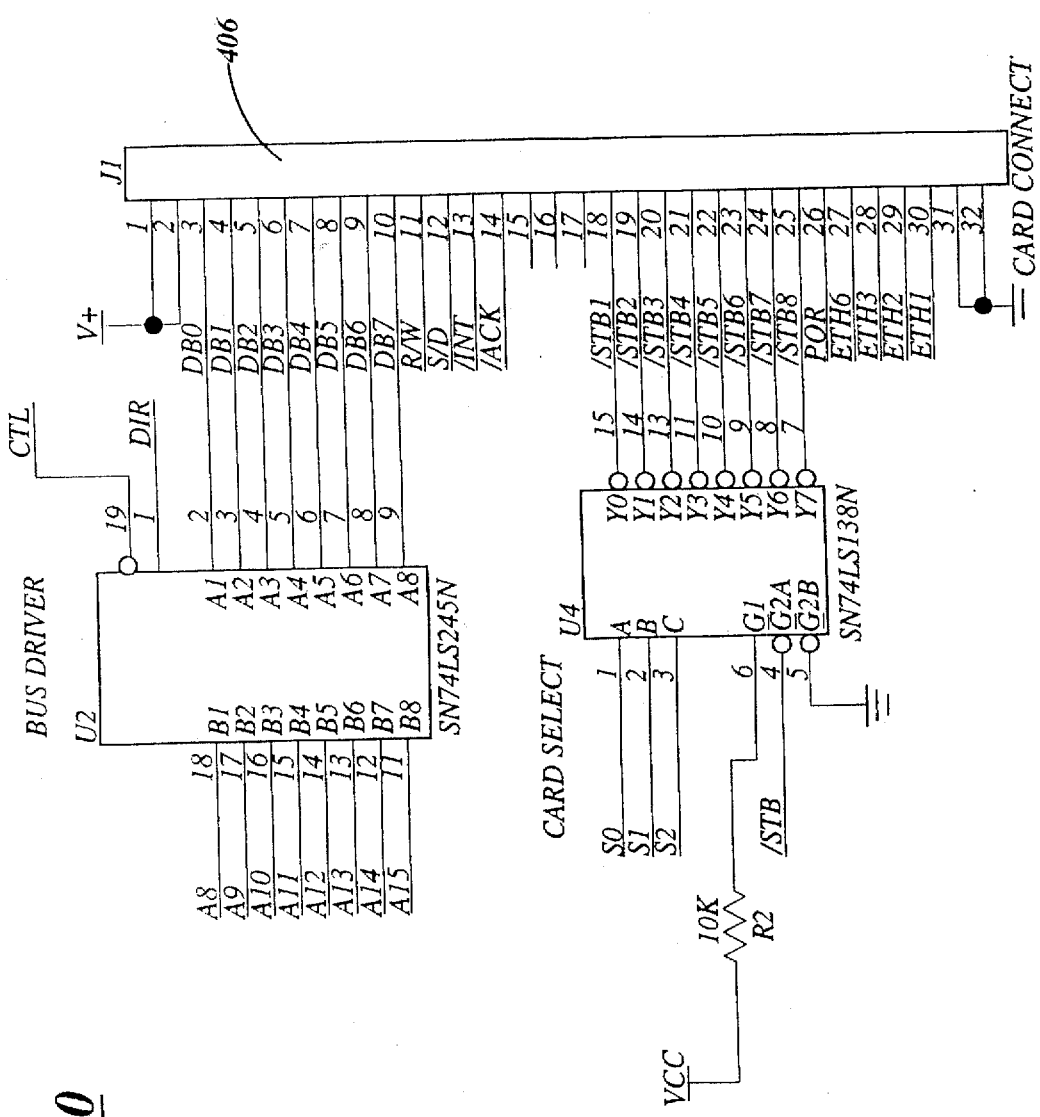
FIG. 30 is a schematic diagram of the drivers and connector used to couple the Ethernet interface to the rack of the system controller.
Figure 31:
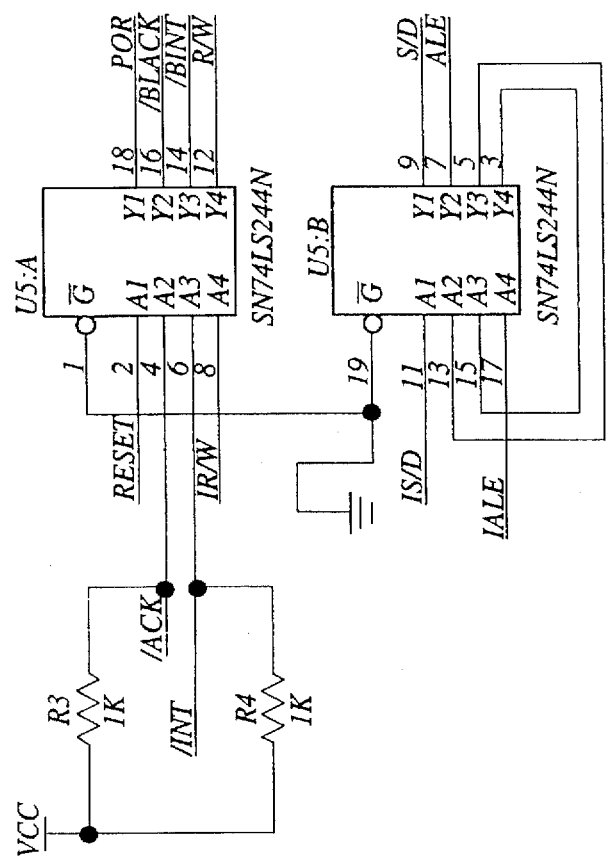
FIG. 31 is a schematic diagram of the memory module of the Ethernet interface.
Figure 32:
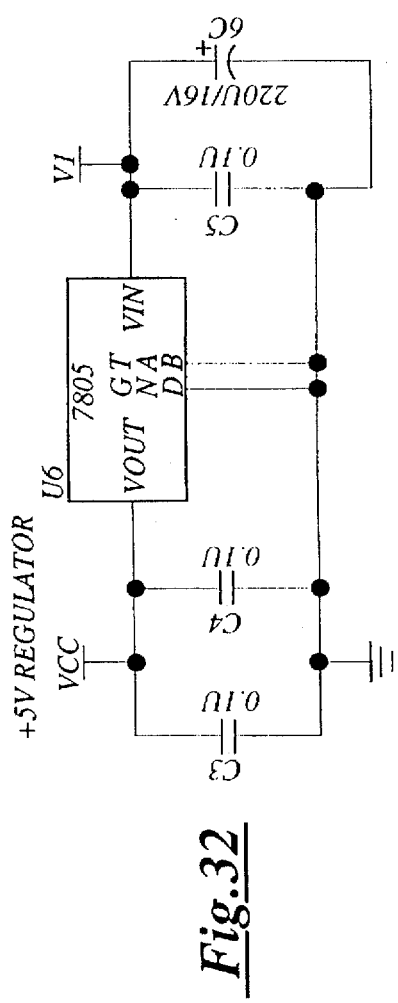
FIG. 32 is a schematic diagram of the voltage regulator of the Ethernet interface.
Figure 33:
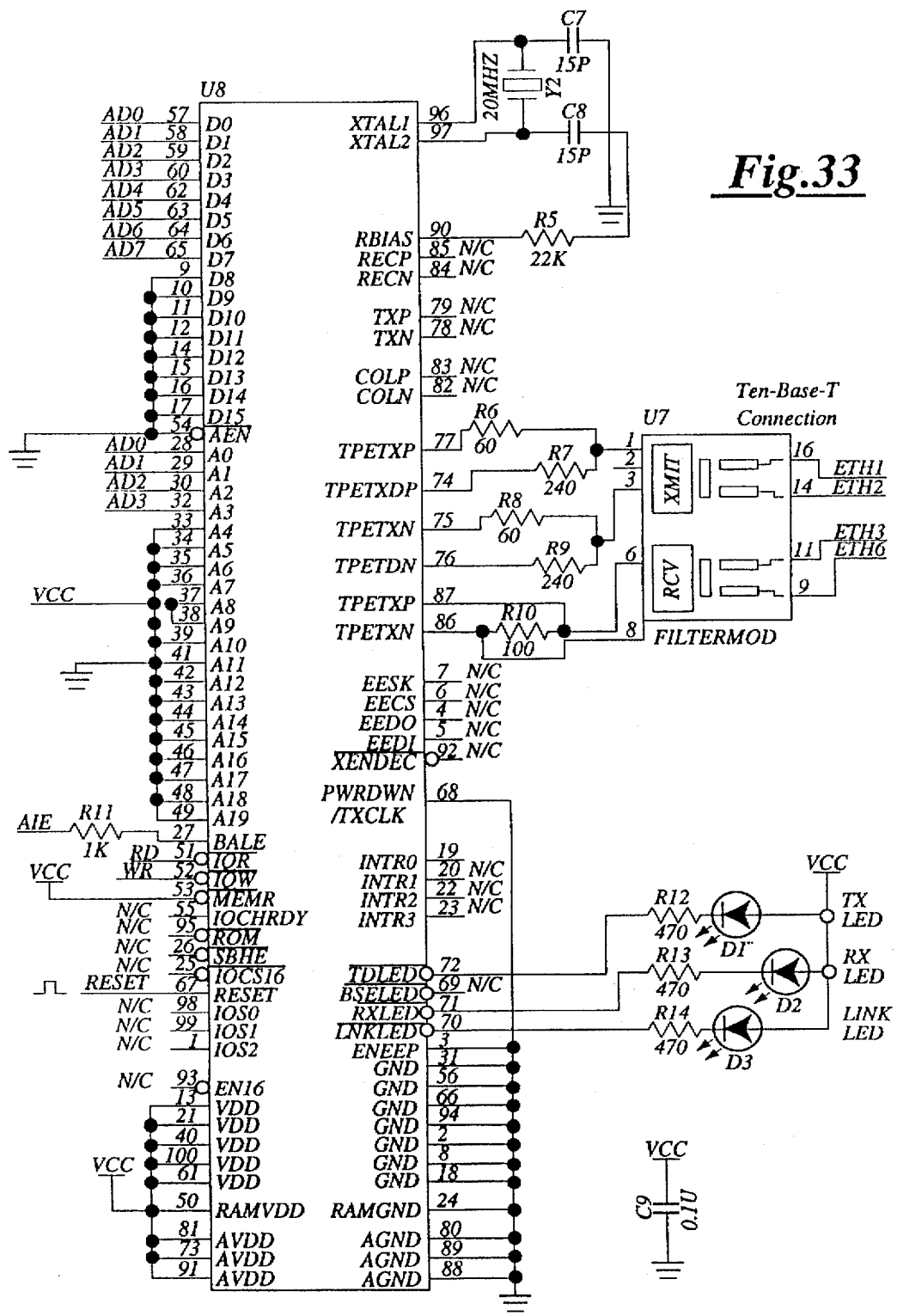
FIG. 33 is a schematic diagram of the drivers for the Ten-Base-T connection and various LED indicators of the Ethernet interface.

The structure of the IRT interface module in this preferred embodiment is shown in FIGS. 25 and 26. The module includes a CMOS microprocessor 300 with 2048 bytes of ROM program storage and 256 bytes of RAM memory. The module also includes a power control circuit shown in FIG. 26 which is electrically connected to microprocessor 300 via the microprocessor's pin 13 (SWPF). An activity LED driver circuit is also provided. This circuit is electrically connected to the circuit shown in FIG. 25 at the connection SWRX SNWTX. All the major components are electrically coupled to the edge connector shown in FIG. 28 so that the card can be plugged into the rack. FIGS. 25–28 show five LEDs. These lights serve to indicate the various functions being performed by the IRT interface module. For example, LED 301 will glow green when more than 12.5 volts d.c. are on the IRT wire power pair. The LED 302 will glow red if a failure occurs on the IRT wire bus which prevents serial communication with the IRTs. LED 303 will glow green whenever serial data has been received and validated from the IRT wire bus. This LED is extinguished after data is delivered to the Ethernet interface module without error. LED 304 glows green whenever the IRT interface module is transmitting or attempting to transmit data on the bus. Finally, LED 305 glows green whenever the IRT interface module is receiving data from the IRT wire bus.

FIGS. 29–35 are intended to show the construction of the Ethernet interface module. This module is used to bridge the data from the IRT interface module to the local area network. The Ethernet interface module includes an Intel 8051 microprocessor with 32,768 bytes of RAM, all of which has a lithium battery backup. One-half of this memory is for program storage and the other half of the memory is for working data storage. The microprocessor 18 shown as 400 in FIG. 29. As shown in FIG. 34, the Ethernet interface module also includes an RJ-11 maintenance jack 401 which provides an RS232 port connection.

Light emitting diodes are present on the Ethernet interface module. LED 402 is attached via the circuit shown in FIG. 5 to the microprocessor 401 using pin 27 (LED) on the microprocessor. This LED is illuminated when data has been received and validated from the IRT interface modules. LED 403 shown in FIG. 33 lights when the module transmits or attempts to transmit data on the Ethernet bus. LED 404 lights when the Ethernet interface module receives data from the Ethernet bus. Finally, LED 405 is illuminated when a good connection exists between the Ethernet module and the bus. Again, jack 406 is provided so that the Ethernet interface module can be inserted and electrically connected to the rest of the components of the rack.

The Ethernet interface module can be provided with a number of setable operating parameters. For example, an accumulation time limit can be set for the time allowed for inbound messages. Typically, this is set at 0.125 seconds. Likewise, the parameters related to retry can be set. For example, the number of retries can be set at five and the time to get a response message from the client computer on the network can be set for two seconds. Thus, if the response to the message is not received within two seconds, the message will be resent. Other items such as the IP address, the Ethernet address, the UPD port number and subnetwork math parameters can be set. This may be done directly via the Ethernet connection or also by using a tool to program the Ethernet interface module which is connected using the RJ-11 maintenance jack.

With the above description clearly in mind, one can see one skilled in the art will now be able to see how messages can be transmitted between the microterminal and the various work stations on the local area network. One can also see how this system can be used to passively track the location of the microterminal within the factory. Two-way communication between the microterminals and the work stations on the local area network is achieved because the microterminals have a display which can display messages sent to the microterminals as well as a series of buttons which can be actuated to send a response back. Those skilled in the art will appreciate the significant advantages provided by this system in a wide variety of manufacturing environments. Although the invention has been described with reference to certain specific embodiments, this description is not meant to be construed in a limiting sense. Modifications of the embodiments disclosed herein, as well as alternative embodiments will be apparent to person skilled in the art after a reading of the disclosure set forth above. It is, therefore, contemplated that of the claims as set forth below will cover all embodiments that fall within the scope of the invention.

I claim:

1. A communications and tracking system for use in a workplace having a plurality of distinct work areas comprising:

(a) a computer system;

(b) a system controller connected to said computer system via a network;

(c) a plurality of transceivers, each transceiver:
  (1) being fixed in one of said distinct areas of the workplace;
  (2) having an infrared transmitter and receiver for modulated light beam communication within the said distinct area where said transceiver is fixed;
  (3) having means for electronically communicating with said system controller;
  (4) having means for translating modulated light communication into electrical communication and electrical communication into modulated light communication; and
  (5) having means for generating beacon messages having a unique identification code imbedded therein.

(d) a plurality of microterminals, each microterminal having:
  (1) a microcontroller;
  (2) operator input means;
  (3) a display;
  (4) an infrared transmitter and infrared receiver for modulated light beam communication with a transceiver when the microterminal is located in the same distinct work area of the workplace as the transceiver; and
  (5) four modes of operation including:
    (a) an operate mode wherein said microcontroller, display and infrared receiver are powered so the microterminal is ready to communicate with the system controller through one of said transceivers;
    (b) a stand-by mode wherein the microcontroller and receiver are periodically activated at a constant predetermined interval to receive beacon messages, to check for a change in the location of the microterminal based upon the identification code imbedded in the beacon message received, and to check for messages directed to the microterminal by the system controller;
    (c) a power saving mode wherein the portable microterminal is activated to check for messages at a predetermined interval which increases incrementally from about 5 seconds to more than 4 minutes over time if no transceiver beacon messages are received by the portable microterminal; and
    (d) an extended sleep mode invoked by a message issued to the microterminal by the system controller through one of said transceivers, in which the microterminal cannot communicate with the system controller or changing to another mode in the absence of activation of the operator input means.

2. The system of claim 1 wherein each of said portable microterminals generates a message to the system controller through the transceiver if the portable microterminal determines it has been moved from one distinct area of the workplace to another.

3. The communication and tracking system of claim 1 wherein each of said portable microterminals has:

(a) an operate mode wherein said microcontroller, display and infrared receiver are powered so the microterminal is ready to communicate with the system controller through one of said transceivers;

(b) a stand-by mode wherein the microcontroller and receiver are periodically activated to receive the transceiver beacon messages, to check the location of the microterminal, and to check for messages directed to the microterminal by the system controller.

(c) a motion detection switch to change the microterminal from the stand-by mode to the operate mode.

4. The communication and tracking system of claim 1 wherein each of said portable microterminals stores text messages and graphic images, received from the system controller through one of said transceivers, and recalling said text messages and graphic images to the display based on signals received from the operator input means or from the system controller through one of said transceivers.

5. The communication and tracking system of claim 1 wherein each of said portable microterminals has a unique identification means used to track the location of a specific portable microterminal, used to address messages to a specific portable microterminal, and used to identify which specific microterminal is the source of a message.

6. The system of claim 1 wherein at least one of said portable microterminals can be attached to a work piece to be processed in the workplace.

7. The communication and tracking system of claim 1 wherein at least one of said portable microterminals can be worn by a worker.

8. The communication and tracking system of claim 1 wherein at least one of said portable microterminals can be attached to a container for items to be processed in the workplace.

9. A communication and tracking system including at least one portable microterminal having a transmitter, a receiver, a microcontroller, operator input means, and a display, said microterminal having:

(a) an operate mode wherein said microcontroller, display, and receiver are powered so that the microterminal is ready to communicate;

(b) a stand-by mode wherein the microcontroller and receiver are periodically activated at a predetermined fixed interval to receive transceiver beacon messages, to check the location of the microterminal and to check for messages directed to the microterminal;

(c) a power saving mode wherein said microterminal is activated to check for messages at a predetermined interval which increases incrementally from about 5 seconds to more than 4 minutes over time if no beacon messages are received by said microterminal;

(d) an extended sleep mode involved by a message received by the microcontroller's receiver and terminated by activation of the operator input means; and (e) a motion detection switch for changing the microterminal from the stand-by mode to the operate mode.

\* \* \* \* \*